US012233367B2

(12) United States Patent
Gao et al.

(10) Patent No.: US 12,233,367 B2
(45) Date of Patent: *Feb. 25, 2025

(54) FILTER MEDIA, ELEMENTS, AND METHODS

(71) Applicant: Donaldson Company, Inc., Bloomington, MN (US)

(72) Inventors: Qiong Gao, Minneapolis, MN (US); Richard Patrick DeJong, Eden Prairie, MN (US); Gregory S. Tronnes, Richfield, MN (US); Jason A. Tiffany, Bloomington, MN (US); Giancarlo M. Izzi, Minneapolis, MN (US)

(73) Assignee: Donaldson Company, Inc., Bloomington, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/502,885

(22) Filed: Nov. 6, 2023

(65) Prior Publication Data

US 2024/0139662 A1 May 2, 2024

Related U.S. Application Data

(63) Continuation of application No. 17/499,746, filed on Oct. 12, 2021, now Pat. No. 11,845,027, which is a (Continued)

(51) Int. Cl.
*B01D 39/16* (2006.01)
*B01D 39/20* (2006.01)

(52) U.S. Cl.
CPC ..... *B01D 39/1623* (2013.01); *B01D 39/2017* (2013.01); *B01D 2239/025* (2013.01);
(Continued)

(58) Field of Classification Search
None
See application file for complete search history.

(56) References Cited

U.S. PATENT DOCUMENTS

| 3,341,497 A | 9/1967 | Sherman et al. |
| 5,306,321 A | 4/1994 | Osendorf |

(Continued)

FOREIGN PATENT DOCUMENTS

| CN | 1625429 | 6/2005 |
| CN | 100484607 | 5/2009 |

(Continued)

OTHER PUBLICATIONS

ASTM F1215-89, "Standard Test Method for Determining the Initial Efficiency of a Flatsheet Filter Medium in an Airflow Using Latex Spheres", Annual Book of ASTM Standards, Feb. 24, 1989, American Society for Testing and Materials, Philadelphia, Pennsylvania, 9 pages.
(Continued)

*Primary Examiner* — Jason M Greene
(74) *Attorney, Agent, or Firm* — Mueting Raasch Group

(57) ABSTRACT

Fibrous filter medium that includes a surface-loading filter layer comprising fine fibers having an average diameter of less than 1 micron; a depth loading filter layer; and a support layer; wherein the layers are configured and arranged for placement in a gas stream with the surface loading filter layer being the most upstream layer.

20 Claims, 7 Drawing Sheets

Related U.S. Application Data continuation of application No. 16/301,163, filed as application No. PCT/US2017/031222 on May 5, 2017, now Pat. No. 11,161,070.

(60) Provisional application No. 62/351,401, filed on Jun. 17, 2016, provisional application No. 62/336,433, filed on May 13, 2016.

(52) U.S. Cl.
CPC ............... B01D 2239/0622 (2013.01); B01D 2239/065 (2013.01); B01D 2239/0654 (2013.01); B01D 2239/0668 (2013.01); B01D 2239/0681 (2013.01); B01D 2239/1233 (2013.01); B01D 2239/1258 (2013.01); B01D 2239/1266 (2013.01); B01D 2239/1275 (2013.01)

(56) References Cited

U.S. PATENT DOCUMENTS

| | | | |
|---|---|---|---|
| 6,090,173 | A | 7/2000 | Johnson et al. |
| 6,196,708 | B1 | 3/2001 | Rogers |
| 6,395,046 | B1 | 5/2002 | Emig et al. |
| 6,673,136 | B2 | 1/2004 | Gillingham et al. |
| 6,716,274 | B2 | 4/2004 | Gogins et al. |
| 6,746,517 | B2 | 6/2004 | Benson et al. |
| 6,800,117 | B2 | 10/2004 | Barris et al. |
| 6,875,256 | B2 | 4/2005 | Gillingham et al. |
| 7,008,465 | B2 | 3/2006 | Graham et al. |
| 7,309,372 | B2 | 12/2007 | Kahlbaugh et al. |
| 7,314,497 | B2 | 1/2008 | Kahlbaugh et al. |
| 7,316,723 | B2 | 1/2008 | Chung et al. |
| 7,837,756 | B2 | 11/2010 | Choi |
| 7,883,562 | B2 | 2/2011 | Healey et al. |
| 7,985,344 | B2 | 7/2011 | Dema et al. |
| 8,057,567 | B2 | 11/2011 | Webb et al. |
| 8,118,901 | B2 | 2/2012 | Chung et al. |
| 8,268,033 | B2 | 9/2012 | Rogers et al. |
| 8,535,404 | B2 | 9/2013 | Crabtree et al. |
| 11,161,070 | B2 * | 11/2021 | Gao .................. B01D 39/2017 |
| 11,845,027 | B2 * | 12/2023 | Gao ..................... B01D 39/163 |
| 2002/0046656 | A1 | 4/2002 | Choi |
| 2004/0038014 | A1 | 2/2004 | Schaefer et al. |
| 2004/0255783 | A1 | 12/2004 | Graham et al. |
| 2006/0096263 | A1 | 5/2006 | Kahlbaugh et al. |
| 2006/0242933 | A1 | 11/2006 | Webb et al. |
| 2008/0245037 | A1 | 10/2008 | Rogers et al. |
| 2008/0245041 | A1 | 10/2008 | Choi |
| 2009/0120868 | A1 | 5/2009 | Hüppchen et al. |
| 2010/0119794 | A1 | 5/2010 | Manstein et al. |
| 2010/0313757 | A1 | 12/2010 | Crabtree et al. |
| 2011/0064928 | A1 | 3/2011 | Bonneh |
| 2011/0209622 | A1 | 9/2011 | Hiner et al. |
| 2011/0210059 | A1 | 9/2011 | Green et al. |
| 2011/0210060 | A1 | 9/2011 | Green et al. |
| 2011/0210061 | A1 | 9/2011 | Li et al. |
| 2011/0210081 | A1 | 9/2011 | Green et al. |
| 2013/0008313 | A1 | 1/2013 | Handley et al. |
| 2014/0260137 | A1 | 9/2014 | Amsden et al. |
| 2014/0260142 | A1 | 9/2014 | Raether |
| 2014/0319047 | A1 | 10/2014 | Cheng et al. |
| 2014/0331626 | A1 * | 11/2014 | Nagy .................. B01D 39/1623 55/487 |
| 2014/0366732 | A1 | 12/2014 | Gao et al. |
| 2015/0211453 | A1 | 7/2015 | Hu et al. |
| 2015/0298068 | A1 | 10/2015 | Park et al. |
| 2016/0023146 | A1 | 1/2016 | Hampton et al. |
| 2016/0051918 | A1 | 2/2016 | Walz et al. |
| 2016/0129381 | A1 | 5/2016 | Gao et al. |
| 2016/0303498 | A1 * | 10/2016 | Doucoure .......... B01D 39/1623 |
| 2022/0118387 | A1 | 4/2022 | Gao et al. |

FOREIGN PATENT DOCUMENTS

| | | |
|---|---|---|
| CN | 101678254 | 3/2010 |
| CN | 101939072 | 1/2011 |
| CN | 104117288 | 10/2014 |
| CN | 105209147 | 12/2015 |
| DE | 102007023806 | 11/2008 |
| EP | 1 048 335 | 11/2000 |
| GB | 1 516 721 | 7/1978 |
| JP | S55-500304 | 5/1980 |
| JP | S56-129024 | 10/1981 |
| JP | 2008-518772 A | 6/2008 |
| JP | 2008221073 | 9/2008 |
| JP | 2010520049 | 6/2010 |
| JP | 2013022570 | 2/2013 |
| JP | 2015520666 | 7/2015 |
| KR | 10-2003-0081302 | 10/2003 |
| KR | 10-1484510 | 1/2015 |
| RU | 2 188 694 | 9/2002 |
| RU | 2 389 529 | 5/2010 |
| RU | 2 537 617 | 1/2015 |
| RU | 2 563 273 | 9/2015 |
| RU | 2 579 344 | 4/2016 |
| WO | 79/01129 | 12/1979 |
| WO | 03/064006 | 8/2003 |
| WO | 2009/014539 | 1/2009 |
| WO | 2009/062009 | 5/2009 |
| WO | 2010/144772 | 12/2010 |
| WO | 2013/025445 | 2/2013 |
| WO | 2013/090330 | 6/2013 |
| WO | 2014/149750 | 9/2014 |
| WO | 2014/173733 | 10/2014 |

OTHER PUBLICATIONS

Chinese Patent Application No. 201780028739.5, filed May 5, 2017, First Office Action and Search Report issued Aug. 27, 2020, with translation. 31 pages.

Data Sheet, "Filter Media: Ultra-Web® on Spunbond", May 2011, Donaldson Company, Inc., Minneapolis, Minnesota, 1 page. Available online at https://www.donaldson.com/content/dam/donaldson/dust-fume-mist/literature/emea/filters-parts/cartridge/performance/data-sheet/ultra-web-spunbond-replacement-cartridge-filters.pdf. Retrieved from the internet on Sep. 18, 2020.

Data Sheet, "Replacement Element Media", Nov. 2007, Donaldson Company, Inc., Minneapolis, Minnesota, 2 pages. Available online at https://www.donaldson.com/content/dam/donaldson/dust-fume-mist/literature/emea/filters-parts/cartridge/performance/data-sheet/ultra-web-replacement-cartridge-filters.pdf. Retrieved from the internet on Sep. 18, 2020.

International Patent Application No. PCT/US2017/031222 filed May 5, 2017, International Preliminary Report on Patentability issued Nov. 13, 2018, 6 pages.

International Patent Application No. PCT/US2017/031222 filed May 5, 2017, International Search Report and Written Opinion issued Jul. 13, 2017, 8 pages.

Product Information Sheet, "Filtration Solutions for Industrial Processes", 2017, Donaldson Company, Inc., Minneapolis, Minnesota, 8 pages. Available online at https://www.donaldson.com/content/dam/donaldson/membranes/literature/emea/f117951-eng/Membrane-Solutions-for-Industrial-Processes.pdf. Retrieved from the internet on Sep. 18, 2020.

Product Information Sheet, "Introducing Donaldson Blue® Filters with New Ultra-Web® HD Media", 2019, Donaldson Company, Inc., Minneapolis, Minnesota, 8 pages. Available online at https://www.donaldson.com/content/dam/donaldson/engine-hydraulics-bulk/literature/north-america/air/f111434-eng/Donaldson-Blue-Ultra-Web-HD-Air-Filters. pdf. Retrieved from the internet on Sep. 18, 2020.

Product Information Sheet, "Tetratex® PTFE Membrane Bag Filters: Bag Filter Media for Baghouse Dust Collectors", 2015, Donaldson Company, Inc., Minneapolis, Minnesota, 2 pages. Available online at https://www.donaldson.com/content/dam/donaldson/dust-fume-mist/literature/north-america/filters-parts/baghouse/fabric-bags/

(56) References Cited

OTHER PUBLICATIONS specialty/ptfe-tetratex/f118109/Tetratex-PTFE-Bag-Filter.pdf. Retrieved from the internet on Sep. 18, 2020.
Product Information Sheet, "Ultra-Web® Cartridge: Engineered for Dust Collection", 2011, Donaldson Company, Inc., Minneapolis, Minnesota, 4 pages. Available online at https://www.donaldson.com/content/dam/donaldson/dust-fume-mist/literature/north-america/filters-parts/cartridge/premium/ultra-web/f118123/Ultra-Web-Cartridge-Filter-Media.pdf. Retrieved from the internet on Sep. 18, 2020.
Product Information Sheet, "Ultra-Web® Nanofiber Technology: Advanced, Proven Nanofiber Air Filtration Technology", 2018, Donaldson Company, Inc., Minneapolis, Minnesota, 2 pages. Available online at https://www.donaldson.com/content/dam/donaldson/engine-hydraulics-bulk/literature/north-america/air/F111274-ENG/Ultra-Web-Air-Filtration-Nanofiber-Technology.pdf. Retrieved from the internet on Sep. 18, 2020.
Product Information Sheet, "Ultra-Web®: High Efficiency Fine Fiber Filters Built to Last", 2016, Donaldson Company, Inc., Minneapolis, Minnesota, 8 pages. Available online at https://www.donaldson.com/content/dam/donaldson/dust-fume-mist/literature/north-america/filters-parts/cartridge/premium/ultra-web/f118043/Ultra-Web-Media.pdf. Retrieved from the internet on Sep. 18, 2020.
Russian Patent Application No. 2018141964, filed Nov. 28, 2018, First Office Action and Search Report issued Jun. 16, 2020, 7 pages.
TAPPI No. T543, T 543 om-11, "Bending resistance of paper (Gurley-type tester)", 2011, TAPPI, Atlanta, Georgia, 7 pages.

\* cited by examiner

FILTER MEDIA, ELEMENTS, AND METHODS

CONTINUING APPLICATION DATA

This application is a continuation of U.S. patent application Ser. No. 17/499,746, filed Oct. 10, 2021, issued as U.S. Pat. No. 11,845,027, issued on Dec. 19, 2023; which is a continuation of U.S. patent application Ser. No. 16/301,163, filed Nov. 13, 2018, issued as U.S. U.S. Pat. No. 1,116,170, issued on Nov. 2, 2021; which is the § 371 U.S. National Stage of International Application No. PCT/US2017/031222, filed May 5, 2017, which claims the benefit of U.S. Provisional Application No. 62/336,433, filed May 13, 2016, and U.S. Provisional Application No. 62/351,401, filed Jun. 17, 2016, the disclosures of which are incorporated by reference herein in their entireties.

BACKGROUND

Fluid streams, particularly air and gas streams, often carry particulate material therein. The removal of some or all of the particulate material from the fluid stream is needed. For example, air intake streams to the cabins of motorized vehicles, air in computer disk drives, HVAC air, clean room ventilation air, air to engines for vehicles or power generation equipment, gas streams directed to gas turbines, and air streams to various combustion furnaces, often include particulate material therein. In the case of cabin air filters it is desirable to remove the particulate matter for comfort of the passengers and/or for aesthetics. With respect to air and gas intake streams to engines, gas turbines and combustion furnaces, it is desirable to remove the particulate material because particulate can cause substantial damage to the internal workings of the various mechanisms involved. In other instances, production gases or off-gases from industrial processes or engines may contain particulate material therein. Before such gases are discharged to the atmosphere, it is typically desirable to obtain a substantial removal of particulate material from those streams.

Higher and higher efficiency filters are needed to get cleaner air or other gas streams. Low pressure is desired to have less restriction to gas (e.g., air) flow caused by high efficiency filters. Also, longer life is desired to reduce the maintenance and filter costs, which is often a challenge in high efficiency filters. Thus, there continues to be a need for high performance filters, i.e., high efficiency, low pressure-drop, long-life filters.

SUMMARY

The present disclosure provides filter media and filter elements, particularly for gas (e.g., air) filtration applications.

In one embodiment, there is provided a gas filter medium (e.g., air filter medium) that includes: a surface loading filter layer including fine fibers having an average diameter of less than 1 micron; a depth loading layer; and a support layer. During use, the layers are configured and arranged for placement in a gas stream with the surface loading filter layer being the most upstream layer. That is, the layers are positioned relative to each other such that the surface loading filter layer is positioned as the first layer encountered by the gas (e.g., air) stream being filtered (i.e., the fine fiber filter layer is the most upstream layer). In certain embodiments, filter media of the present disclosure are pulse cleanable.

In another embodiment of the present disclosure, there is provided a gas filter element (e.g., air filter element) that includes a housing and a filter medium as described herein.

In another embodiment of the present disclosure, there is provided a method of filtering gas (e.g., air), the method including directing the gas through a filter medium or filter element as described herein.

In certain embodiments, the depth loading filter layer includes a high-efficiency glass-containing filter layer, a melt-blown filter layer, or a combination thereof. A high-efficiency glass-containing filter layer may include glass fibers and multi-component binder fibers. A high-efficiency melt-blown filter layer may include fibers having an average diameter of 0.5 micron to 10 microns.

Herein, "high-efficiency" for a filter layer of the present disclosure is able to remove at least 55% (by number) of 0.4-micron size DEHS particles at 4 feet per minute (ft/min or fpm) (i.e., 2 centimeters per second (cm/sec)). For example, a filtration efficiency of at least 70% at 0.4 micron is considered "high efficiency." In certain embodiments herein, high-efficiency means removing at least 70%, at least 80%, at least 85%, at least 95%, at least 99.5%, at least 99.95%, or at least 99.995%, of such particles, at 4 ft/min (2 cm/sec).

Herein, "high-efficiency" for a composite filter medium (which may or may not be corrugated) and/or filter element (which is typically corrugated and pleated) of the present disclosure displays an efficiency of at least F9 per EN779:2012. Additionally, a "high-efficiency" filter element (which is typically corrugated and pleated) of the present disclosure displays an efficiency of at least E10, or at least E11, or at least E12 per EN1822:2009.

The term "melt-blown fibers" refers to fibers formed by extruding a molten thermoplastic material through a plurality of fine, usually circular, die capillaries as molten threads or filaments into converging high velocity gas (e.g., air) streams which attenuate the filaments of molten thermoplastic material to reduce their diameter, which may be to microfiber diameter. Thereafter, the melt-blown fibers are carried by the high velocity gas stream and are deposited on a collecting surface to form a web of randomly dispersed melt-blown fibers. Typically, melt-blown fibers are microfibers which may be continuous or discontinuous, are generally equal to or smaller than 20 microns (and often 10 microns) in diameter, and are generally self bonding when deposited onto a collecting surface. Melt-blown fibers used in the present invention are preferably substantially continuous in length.

The term "multi-component fibers" refers to fibers formed from at least two polymers extruded separately but spun together to form one fiber. As a particular example of a multi-component fiber, a "bicomponent fiber" includes two polymers arranged in substantially constantly positioned distinct zones across the cross-section of the bicomponent fiber and extend continuously along the length of the bicomponent fiber. The configuration of such a bicomponent fiber may be, for example, a sheath/core configuration wherein one polymer is surrounded by another or may be a side-by-side configuration or an "islands-in-the-sea" configuration. For two component fibers, the polymers may be present in ratios of 75/25, 50/50, 25/75 or any other desired ratios. Conventional additives, such as pigments and surfactants, may be incorporated into one or both polymer streams, or applied to the filament surfaces.

The term "polymer" includes, but is not limited to, homopolymers, copolymers, such as for example, block, graft, random and alternating copolymers, terpolymers, etc., and blends and modifications thereof. Furthermore, unless otherwise specifically limited, the term "polymer" shall include all possible geometrical configurations of the material. These configurations include, but are not limited to, isotactic, syndiotactic, and atactic symmetries. The term "copolymer" refers to a polymer that includes two or more different monomeric units, thereby including terpolymers, tetrapolymers, etc.

The terms "comprises" and "includes" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure.

In this application, terms such as "a," "an," and "the" are not intended to refer to only a singular entity, but include the general class of which a specific example may be used for illustration. The terms "a," "an," and "the" are used interchangeably with the term "at least one."

The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.). Herein, "up to" a number (e.g., up to 50) includes the number (e.g., 50).

The term "in the range" or "within a range" (and similar statements) includes the endpoints of the stated range.

Reference throughout this specification to "one embodiment," "an embodiment," "certain embodiments," or "some embodiments," etc., means that a particular feature, configuration, composition, or characteristic described in connection with the embodiment is included in at least one embodiment of the invention. Thus, the appearances of such phrases in various places throughout this specification are not necessarily referring to the same embodiment of the invention. Furthermore, the particular features, configurations, compositions, or characteristics may be combined in any suitable manner in one or more embodiments.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DRAWINGS

The disclosure may be more completely understood in connection with the following drawings.

DETAILED DESCRIPTION OF ILLUSTRATIVE EMBODIMENTS

The present disclosure provides filter media and filter elements, particularly for gas (e.g., air) filtration applications.

In one embodiment, a gas filter medium (e.g., air filter medium) that includes: a surface loading filter layer comprising fine fibers having an average diameter of less than 1 micron; a depth loading filter layer; and a support layer.

During use, the layers are configured and arranged for placement in a gas stream with the surface loading filter layer being the most upstream layer. That is, the layers are positioned relative to each other such that the surface loading filter layer (i.e., fine fiber filter layer) is positioned as the first layer encountered by the gas (e.g., air) stream being filtered (i.e., the fine fiber filter layer is the most upstream layer).

In certain embodiments, filter media of the present disclosure are pulse cleanable. Pulse cleanable is important for self cleaning (e.g., via back air pulses) and is useful when the filter medium is used for very high dust concentration. Pulse cleanability can be determined according to the Modified ISO 11057 Test Method described in the Examples Section.

In certain embodiments, a composite filter media includes two or more fine fiber filter layers. In certain embodiments, a composite filter media includes two or more depth loading layers (e.g., glass-containing filter layers, melt-blown filter layers, or combinations thereof). In certain embodiments, a composite filter media includes two or more support layers. These layers can be arranged in a variety of orders as long as one of the fine fiber filter layer is the most upstream layer.

Each filter layer and support layer can be a composite of multiple layers. For example, a depth loading layer can be a composite of two or more different layers of melt-blown fibers, either differing in composition and/or fiber diameter.

In certain embodiments, a filter medium of the present disclosure has a thickness of at least 10 mils (0.25 mm). In certain embodiments, a filter medium of the present disclosure has a thickness of up to 60 mils (1.5 mm), or up to 30 mils (0.76 mm).

Figure 1:
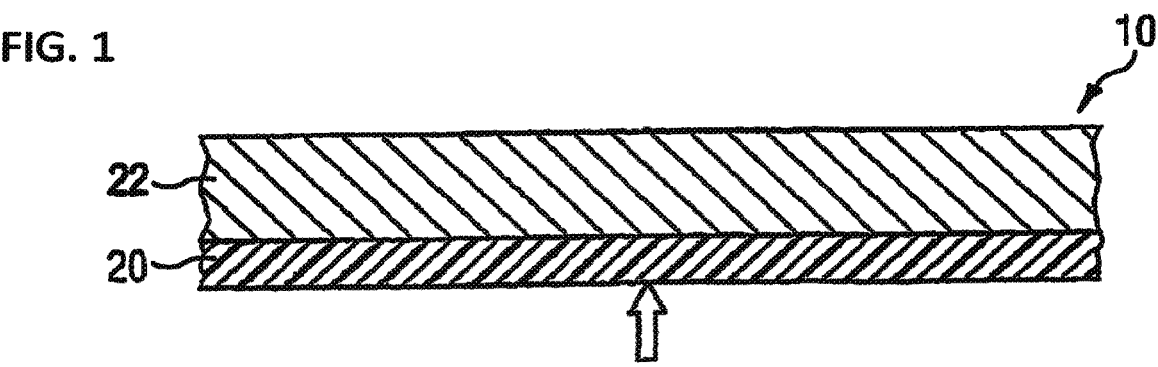
FIG. 1 is a cross sectional view of a portion of an embodiment of a composite filter media of the present disclosure.
Figure 2:
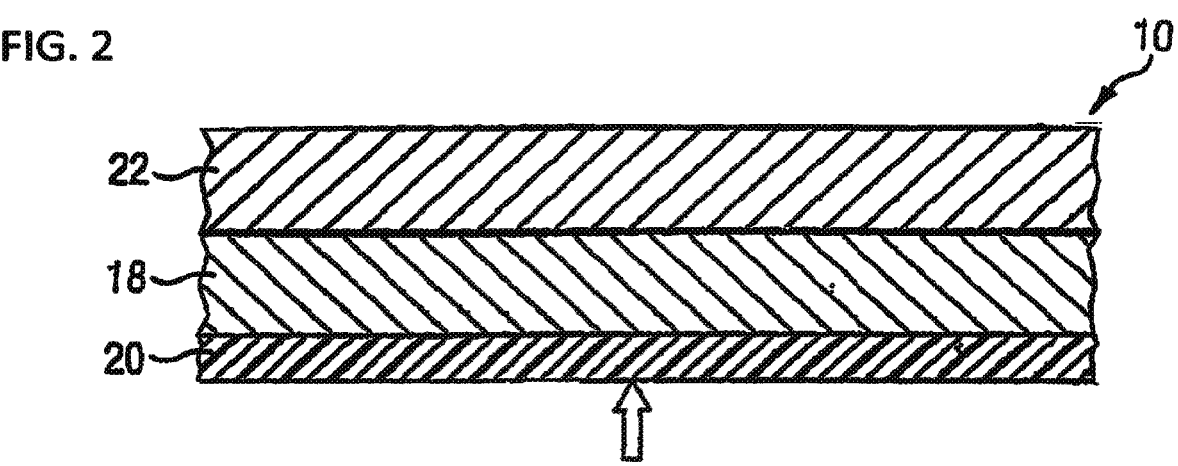
FIG. 2 is a cross sectional view of an embodiment of a composite filter media of the present disclosure.
Figure 3:
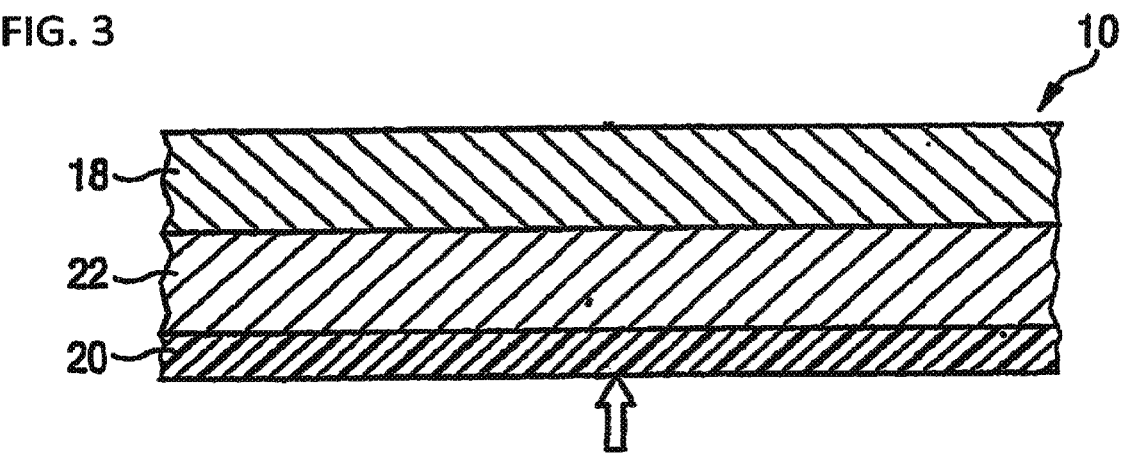
FIG. 3 is a cross sectional view of an embodiment of a composite filter media of the present disclosure.

As shown in FIG. 1, which shows a portion of an exemplary composite filter medium 10 of the present disclosure, there are at least two filter layers, i.e., layers that perform filtration: a surface loading layer 20, and a depth loading filter layer (e.g., glass-containing filter layer) 22. In one embodiment, as shown in FIG. 2, which shows an exemplary composite filter medium 10 of the present disclosure, there are: a surface loading layer 20, a depth loading filter layer (e.g., glass-containing filter layer) 22, and a support layer 18 positioned between the depth loading layer 22 and the surface loading layer 20. In another embodiment, as shown in FIG. 3, which shows an exemplary composite filter medium 10 of the present disclosure, there are: a support layer 18; a surface loading layer 20, and a depth loading filter layer (e.g., glass-containing filter layer) 22 positioned between the support layer 18 and the surface loading layer 20.

As shown in these exemplary embodiments, the surface loading filter layer 20 is positioned upstream of the depth loading filter layer 22 relative to the direction of gas flow (e.g., air flow) indicated by an arrow. That is, the surface loading filter layer 20 is the first layer encountered by the gas (e.g., air) stream during use.

The thicknesses of each of the filter and support layers may be the same or different, and are not limiting. However, it is noted that thickness has an effect on filtration properties. The overall thickness of the media is desirably minimized without significantly affecting the other media properties, such as dust loading capacity, efficiency, and permeability. This allows for more pleats in an element, for example, preferably such that a filter element includes a maximum amount of media without adversely affecting the filter element properties and performance (e.g., efficiency, pressure drop, or dust loading capacity).

Typically, in a filter medium of the present disclosure, the filter layers, and preferably, the filter and support layers are adhered together with adhesive, binder fibers, thermal bonding, ultrasonic bonding, self-adhesion, or using a combination of such techniques. Preferred methods include the use of an adhesive, binder fibers, or a combination thereof. A particularly preferred method is through the use of an adhesive (pressure sensitive adhesives, hot melt adhesives) applied in a variety of techniques, including, for example, powder coating, spray coating, or the use of a pre-formed adhesive web. Typically, the adhesive is in a continuous layer, or it can be patterned if so desired as long as the filter medium does not delaminate during processing or use.

Exemplary adhesives include hot melt adhesives such as polyesters, polyamides, acrylates, or combinations thereof (blends or copolymers).

If an adhesive is used, the amount of adhesive can be readily determined by one of skill in the art. A desired level is one that provides suitable bonding between the layers without adversely impacting the gas flow through the media. For example, the reduction of the Frazier permeability of a composite filter medium is preferably less than 20%, or more preferably less than 10%, of the inverse of the sum of the inverse of each layer's permeability (i.e., $(1/A_{perm}+1/B_{perm}+1/C_{perm})^{-1}$). This is also applicable for any other lamination methods.

In order to increase rigidity and provide better flow channel in an element, a filter medium can be corrugated. Thus, in certain embodiments, filter media of the present disclosure should have the characteristics to survive a typical hot corrugation process without media damage (which often deteriorate the media performance).

With or without the corrugation, a filter medium can be folded into multiple folds or pleats and then installed in a filter housing or frame. Pleating of a flat sheet or corrugated sheet can be carried out using any number of pleating techniques, including but not limited to, rotary pleating, blade pleating, and the like. The corrugated media may have any one of several pleat supporting mechanisms applied to the pleated media as described in U.S. Pat. No. 5,306,321. For example, corrugated aluminum separators, hot melt beads, and indentations (often referred to as PLEATLOC pleated media) can be used.

In certain embodiments, a fold is imprinted into the filter media in a spacer form so bonding of the folds is prevented in an effective way, even in cases if the media is moist or overloaded. These dents on the pleat tips that are vertical to the corrugation channel direction on both sides of the media, keep pleats separated, and provide better flow channels for gas (e.g., air) to flow through the pleat pack in an element. If in a conical or cylindrical type element, such as that shown in FIGS. 9-14, dents on the outside can be deeper and wider than those on the inside to keep even separation in pleats.

For a noncorrugated media, other pleat separation methods can be used on any of the media described herein, such as those involving the addition of a hot-melt adhesive bead between the pleats, or the use of comb separators. The pleated material can be formed into a cylinder or "tube" and then bonded together, such as through the use of an adhesive (e.g., a urethane-based, hot-melt adhesive, etc.), or ultrasonic welding (i.e., ultrasonic bonding), for example.

In certain embodiments, filter layers, composite filter media (flat or corrugated), and filter elements of the present disclosure are referred to as "high efficiency." In certain embodiments, a high-efficiency filter layer of the present disclosure is able to remove at least 55%, at least 70%, at least 80%, at least 85%, at least 95%, at least 99.5%, at least 99.95%, or at least 99.995% (by number), of 0.4-micron size DEHS particles at 4 ft/min (2 cm/sec). In certain embodiments, a high-efficiency composite filter medium (which may or may not be corrugated) and/or filter element (which is typically corrugated and pleated) of the present disclosure displays an efficiency of at least F9 per EN779:2012. In certain embodiments, a high-efficiency filter element (which is typically corrugated and pleated) of the present disclosure displays an efficiency of at least E10, at least E11, or at least E12 per EN1822:2009.

In certain embodiments, the filter medium of displays an efficiency of at least 80%, or greater than 80%, per the DEHS efficiency test at the most penetrating particle size.

In certain embodiments, a filter layer and/or composite filter medium of the present disclosure has good depth loading characteristics.

In certain embodiments, a depth loading filter layer has a relatively low solidity. As used herein, solidity is the solid fiber volume divided by the total volume of the filter medium at issue, usually expressed as a percentage, or put another way, the volume fraction of media occupied by the fibers as a ratio of the fibers volume per unit mass divided by the media's volume per unit mass. A suitable test for determining solidity is described in, for example, U.S. Patent Publication No. 2014/0260137. Typically, a solidity of less than 20 percent (%) at a pressure of 1.5 pounds per square inch (psi) (i.e., 0.1 kg/cm²), or often less than 15%, is desirable.

In certain embodiments, a filter layer and/or composite filter medium of the present disclosure demonstrates high strength and high flexibility. This can be demonstrated by a relatively low loss in tensile strength after a layer and/or a composite medium has been folded or corrugated. Less than 20% loss of tensile strength after folding or corrugation of a filter layer or filter medium is desirable.

Surface Loading Filter Layer

A surface loading filter layer is a filter layer that captures a substantial portion of incident particles at the surface of the layer, as opposed to the volume or thickness of the filter layer (i.e., in the "z" direction). That is, a surface loading filter layer can stop incident particulate from passing through the surface loading filter layer and can attain substantial surface loadings of trapped particles.

A surface loading filter layer of filter media of the present disclosure includes fine fibers having an average fiber diameter of less than 1 micron (i.e., 1000 nanometers), or up to 0.5 micron, or up to 0.3 micron. This includes nanofibers and microfibers. Nanofiber is a fiber with diameter less than 200 nanometers or 0.2 micron. Microfiber is a fiber with diameter larger than 0.2 micron, but not larger than 10 microns. In certain embodiments, the fine fibers have an average diameter of at least 0.01 micron, or at least 0.05 micron, or at least 0.1 micron.

In certain embodiments, the surface loading filter layer has a basis weight of less than 1 gram per square meter (g/m² or gsm). In certain embodiments, the surface loading filter layer has a basis weight of at least 0.0001 g/m².

In certain embodiments, the surface loading filter layer has a LEFS filtration efficiency of at least 30%, at least 40%, at least 50%, at least 60%, at least 70%, or at least 80%. In certain embodiments, the fine fiber filter layer has a LEFS filtration efficiency of up to 99%, up to 98%, up to 97%, up to 96%, up to 95%, up to 94%, up to 93%, up to 92%, up to 91%, or up to 90%.

Examples of fine fibers are disclosed in U.S. Pat. No. 8,118,901.

A surface loading filter layer of the disclosure may include a random distribution of fine fibers which can be bonded to form an interlocking net. Filtration performance is obtained largely as a result of the fine fiber barrier to the passage of particulate. Structural properties of stiffness, strength, pleatability are typically provided by a support layer included within the filter media (e.g., a support layer to which the fine fibers are adhered).

In certain embodiments, a surface loading filter layer may include fine fiber interlocking networks. Such networks typically include fine fibers in the form of microfibers or nanofibers and relatively small spaces between the fibers. Such spaces typically range, between fibers, of 0.01 micron to 25 microns or often 0.1 micron to 10 microns.

In certain embodiments, the fine fiber adds less than 1 micron in thickness to the overall filter media. In service, the filters can stop incident particulate from passing through the surface loading filter layer and can attain substantial surface loadings of trapped particles. The particles comprising dust or other incident particulates rapidly form a dust cake on the fine fiber surface and maintain high initial and overall efficiency of particulate removal. Even with relatively fine contaminants having a particle size of 0.01 micron to 1 micron, the filter media comprising the fine fibers has a very high dust capacity.

Suitable polymer materials useful for making the fine fibers have substantially improved resistance to the undesirable effects of heat, humidity, high flow rates, reverse pulse cleaning, operational abrasion, submicron particulates, cleaning of filters in use and other demanding conditions.

Examples of fine fibers and the polymer materials of which they are made are disclosed in U.S. Pat. No. 8,118,901. Such polymer materials include both addition polymer and condensation polymer materials such as polyolefin, polyacetal, polyamide, polyester, cellulose ether and ester, polyalkylene sulfide, polyarylene oxide, polysulfone, modified polysulfone polymers and mixtures thereof. Preferred materials that fall within these generic classes include polyethylene, polypropylene, poly(vinylchloride), polymethylmethacrylate (and other acrylic resins), polystyrene, and copolymers thereof (including ABA type block copolymers), poly(vinylidene fluoride), poly(vinylidene chloride), polyvinylalcohol in various degrees of hydrolysis (87% to 99.5%) in crosslinked and non-crosslinked forms. Preferred addition polymers tend to be glassy (a Tg greater than room temperature). This is the case for polyvinylchloride and polymethylmethacrylate, polystyrene polymer compositions or alloys thereof, or for polyvinylidene fluoride and polyvinylalcohol materials.

One class of polyamide condensation polymers are nylon materials. The term "nylon" is a generic name for all long chain synthetic polyamides. Typically, nylon nomenclature includes a series of numbers such as in nylon-6,6 which indicates that the starting materials are a $C_6$ diamine and a $C_6$ diacid (the first digit indicating a $C_6$ diamine and the second digit indicating a $C_6$ dicarboxylic acid compound). Another nylon can be made by the polycondensation of epsilon caprolactam in the presence of a small amount of water. This reaction forms a nylon-6 (made from a cyclic lactam—also known as epsilon-aminocaproic acid) that is a linear polyamide. Further, nylon copolymers are also contemplated.

Copolymers can be made by combining various diamine compounds, various diacid compounds and various cyclic lactam structures in a reaction mixture and then forming the nylon with randomly positioned monomeric materials in a polyamide structure. For example, a nylon 6,6-6,10 material is a nylon manufactured from hexamethylene diamine and a $C_6$ and a $C_{10}$ blend of diacids. A nylon 6-6,6-6,10 is a nylon manufactured by copolymerization of epsilonaminocaproic acid, hexamethylene diamine and a blend of a $C_6$ and a $C_{10}$ diacid material.

Block copolymers are also useful in making the fine fibers. With such copolymers the choice of solvent swelling agent is important. The selected solvent is such that both blocks were soluble in the solvent. One example is an ABA (styrene-EP-styrene) or AB (styrene-EP) polymer in methylene chloride solvent. If one component is not soluble in the solvent, it will form a gel. Examples of such block copolymers are KRATON copolymers of styrene-b-butadiene and styrene-b-hydrogenated butadiene (ethylene propylene), PEBAX copolymers of e-caprolactam-b-ethylene oxide, SYMPATEX polyester-b-ethylene oxide and polyurethanes of ethylene oxide and isocyanates.

Addition polymers like polyvinylidene fluoride, syndiotactic polystyrene, copolymer of vinylidene fluoride and hexafluoropropylene, polyvinyl alcohol, polyvinyl acetate, amorphous addition polymers, such as poly(acrylonitrile) and its copolymers with acrylic acid and methacrylates, polystyrene, poly(vinyl chloride) and its various copolymers, poly(methyl methacrylate) and its various copolymers, can be solution spun with relative ease because they are soluble at low pressures and temperatures. However, highly crystalline polymer like polyethylene and polypropylene require high temperature, high pressure solvent if they are to be solution spun. Therefore, solution spinning of the polyethylene and polypropylene is very difficult. Electrostatic solution spinning is one method of making fine fibers.

In certain embodiments, fine fibers include a single polymeric material. In certain embodiments, fine fibers include a polymer mixture that includes a first polymer and a second, but different polymer (differing in polymer type, molecular weight or physical property) that is conditioned or treated at elevated temperature. The polymer mixture can be reacted and formed into a single chemical species or can be physically combined into a blended composition by an annealing process. Annealing implies a physical change, like crystallinity, stress relaxation or orientation. In certain embodiments, polymer materials are chemically reacted into a single polymeric species such that a Differential Scanning Calorimeter analysis reveals a single polymeric material. Mixtures of similar polymers such as a compatible mixture of similar nylons, similar polyvinylchloride polymers, blends of polyvinylidene chloride polymers are useful in the fibers of the surface loading filter layer.

In certain embodiments, the fine fibers include nylon, polyvinylidene fluoride, polyurethane, or combinations (e.g., blends or copolymers) thereof.

Additive materials can also be used to form a surface coating on the fine fibers that provides oleophobicity, hydrophobicity, or other associated improved stability when contacted with high temperature, high humidity, and difficult operating conditions. Such fine fibers can have a smooth surface including a discrete layer of the additive material or an outer coating of the additive material that is partly solubilized or alloyed in the polymer surface, or both.

Additives include a fluoro-surfactant, a nonionic surfactant, low molecular weight resins, e.g., a tertiary butylphenol resin having a molecular weight of less than about 3000. The resin is characterized by oligomeric bonding between phenol nuclei in the absence of methylene bridging groups. The positions of the hydroxyl and the tertiary butyl group can be randomly positioned around the rings. Bonding between phenolic nuclei always occurs next to hydroxyl group, not randomly. Similarly, the polymeric material can be combined with an alcohol soluble non-linear polymerized resin formed from bis-phenol A. Such material is similar to the tertiary butylphenol resin described above in that it is formed using oligomeric bonds that directly connect aromatic ring to aromatic ring in the absence of any bridging groups such as alkylene or methylene groups.

In certain embodiments, the polymers and optional additives are selected to provide temperature resistance, humidity or moisture resistance, and solvent resistance. In certain embodiments, the polymer material and optional additives are selected to survive intact various operating temperatures, i.e., a temperature of 140° F., 160° F., 270° F., 300° F. for a period of time of 1 hour or 3 hours, depending on end use, while retaining 30%, 50%, 80%, or 90% of filter efficiency or of effective fine fibers in a filter layer. Survival at these temperatures is important at low humidity, high humidity, and in water saturated gas (e.g., air).

In certain embodiments, the polymers and optional additives are selected to provide adhesion of the material to the remainder of the media structure such that the composite media can be processed into a filter structure including pleats, rolled materials, and other structures without significant delamination.

A fine fiber filter layer may include a bi-layer or multilayer structure wherein the filter contains one or more surface loading filter layers combined with or separated by one or more synthetic, cellulosic, or blended webs. Another preferred motif is a structure including fine fiber in a matrix or blend of other fibers.

For pulse cleaning application, an extremely thin layer of fine fibers can help to minimize pressure loss and provide an outer surface for particle capture and release. A thin layer of fibers of less than 1 micron diameter, or less than 0.5-micron diameter is preferred for self-cleaning applications. Good adhesion between the fine fibers and the adjacent layer (e.g., depth loading layer) is important. Self cleaning the surface by back pulsing repeatedly rejuvenates the filter medium. As a great force is exerted on the surface, fine fiber with poor adhesion to substrates can delaminate upon a back pulse that passes from the interior of a filter through a substrate to the surface loading filter layer.

Depth Loading Layer

A depth loading layer is a filter layer that captures particles throughout the volume of the layer. As such, dirt is captured throughout the thickness of the filter layer (i.e., in the "z" direction) as opposed to on the surface of a surface loading filter layer.

A depth loading layer is often characterized in terms of its porosity, density, and solids content percentage. For example, a 5% solidity media means that about 5% of the overall volume comprises solids (e.g., fibrous materials) and the remainder is void space that is filled by air or other fluid.

In certain embodiments, a depth loading filter layer has a relatively low solidity. Typically, a depth loading filter layer has a solidity of less than 20 percent (%) at a pressure of 1.5 psi (i.e., 0.1 kg/cm$^2$), often less than 15%. In certain embodiments, a depth loading filter layer of the present disclosure has a solidity of at least 5 percent at a pressure of 1.5 psi (i.e., 0.1 kg/cm$^2$).

In certain embodiments, a depth loading filter layer has a Frazier permeability (differential pressure set at 0.5 inch of water) of at least 8 liters per square meter per second (l/m$^2$/sec), at least 20 l/m$^2$/sec, at least 40 l/m$^2$/sec, at least 80 l/m$^2$/sec, at least 100 l/m$^2$/sec, or at least 200 l/m$^2$/sec, when evaluated separately from the remainder of the construction. In certain embodiments, a depth loading filter layer has a Frazier permeability (differential pressure set at 0.5 inch of water) of up to 1000 l/m$^2$-sec, up to 800 l/m$^2$-sec, up to 600 l/m$^2$-sec, up to 400 l/m$^2$-sec, or up to 200 l/m$^2$/sec, when evaluated separately from the remainder of the construction.

Another commonly used depth loading filter layer characteristic is fiber diameter. Generally smaller diameter fibers for a given solidity percentage will cause the filter media to become more efficient with the ability to trap smaller particles. Smaller fibers can be packed together in greater numbers without increasing the overall solidity percentage, given the fact that smaller fibers take up less volume than larger fibers.

Because a depth loading filter layer traps particulates substantially throughout the volume or depth, such filter layer can be loaded with a higher weight and volume of particulates as compared to surface loading filter layers over the lifespan of the filter media. Depth loading filter layers, however, tend to have lower efficiencies than surface loading filter layers. To facilitate such high loading capacity, a low-solidity depth loading filter layer is often chosen for use. This may result in a large average pore size, which has the potential to allow some particulates to pass more readily through the filter. Gradient density systems and/or adding a surface loading filter layer can provide for improved efficiency characteristics.

In certain embodiments, a depth loading layer of the filter media of the present disclosure is a high-efficiency filter layer. In certain embodiments, a high-efficiency filter layer displays a filtration efficiency of at least 55%, or at least 70% with 0.4-micron size DEHS (di-ethyl-hexyl-sebacat) particles at 4 ft/min (2 cm/sec). Preferably, the filtration efficiency is at least at least 80%, at least 85%, at least 95%, at least 99.5%, at least 99.95%, or at least 99.995% of the most penetrating particle size (MPPS) particles at 4 ft/min (2 cm/sec).

In certain embodiments, a depth loading layer displays a filtration efficiency of up to 99%, up to 99.5%, up to 99.97%, or up to 99.997%, with 0.4-micron size DEHS (di-ethyl-hexyl-sebacat) particles at 4 ft/min (2 cm/sec).

In certain embodiments, a depth loading filter layer of the present disclosure displays a salt loading capacity of at least 1 gram per square meter (g/m$^2$ or gsm), at least 2 g/m$^2$, at least 3 g/m$^2$, at least 4 g/m$^2$, at least 5 g/m$^2$, at least 6 g/m$^2$, at least 7 g/m$^2$, at least 8 g/m$^2$, at least 9 g/m$^2$, or at least 10 g/m$^2$, at a terminal pressure drop of 2 inches water column rise over initial (i.e., 500 Pa). Typically, the higher salt loading capacity the better, as this is an indicator of life of the product. In certain embodiments, a depth loading filter layer displays a salt loading capacity of up to 10 g/m$^2$ at 500 Pascals pressure rise over initial.

In certain embodiments, a depth loading layer is at least 0.005 inch (125 microns) thick, and often at least 0.01 inch (250 microns) thick. In certain embodiments, a depth loading layer is up to 0.02 inch (500 microns) thick.

In certain embodiments, a depth loading filter layer has a basis weight of at least 10 g/m$^2$, at least 20 g/m$^2$, at least 30 g/m$^2$, at least 40 g/m$^2$, or at least 50 g/m$^2$. In certain embodiments, a depth loading filter layer has a basis weight of up to 150 g/m$^2$, up to 140 g/m$^2$, up to 130 g/m$^2$, up to 120 g/m$^2$, up to 110 g/m$^2$, up to 100 g/m$^2$.

In certain embodiments, the depth loading layer displays a dust loading capacity of at least 0.5 g/ft$^2$ (5.4 g/m$^2$) at 2 inches water pressure rise and 10 ft/min (5.8 cm/sec) with 0.3 micron NaCl particles. In certain embodiments, the depth loading layer displays a dust loading capacity of up to 5 g/ft$^2$ (53.8 g/m$^2$) at 2 inches water pressure rise and 10 ft/m in (5.8 cm/sec) with 0.3 micron NaCl particles.

In certain embodiments, a depth loading layer includes a glass-containing filter layer, a melt-blown filter layer, or a combination thereof.

In certain embodiments, a depth loading layer includes a glass-containing filter layer. In certain embodiments of a glass-containing filter layer, such layer includes glass fibers having an average diameter of up to 2 microns, up to 1 micron, or up to 0.5 micron. In certain embodiments, the glass fibers have an average diameter of at least 0.01 micron, at least 0.05, at least 0.1 micron, at least 0.2 micron, at least 0.3 micron, or at least 0.4 micron.

A glass-containing filter layer may also include fibers other than the glass-containing fibers. For example, it may contain multi-component fibers, typically bicomponent fibers, that function as binder fibers. A preferred example is bicomponent binder fibers that are core-sheath fibers having a low melting point polyester sheath and a higher melting point polyester core. Bicomponent fibers typically have fiber diameters of at least 10 microns.

A glass-containing filter layer may also include polyester fibers distinct from the multi-component fibers. Preferred glass-containing filter layers of the present disclosure include only glass fibers and bicomponent binder fibers. In certain embodiments, the polyester fibers distinct from the multi-component binder fibers have an average diameter of 10 microns to 14 microns.

Fibers of the glass-containing filter layer may be made by a variety of processes. In certain embodiments, the glass-containing filter layer is created using a wet-laid process.

Although the binder fibers in the glass-containing filter layer are used to avoid the use of any binder resin, such resin can be added to further improve its strength. Examples of suitable binder resins include solvent-based or water-based latex resins, water-based styrene acrylics, solvent-based phenolics, and solvent-based non-phenolics, such as that available under the tradename HYCAR 26138 from Lubrizol of Cleveland, OH. Typically, if used, a binder resin could be present in the glass-containing filter layer in an amount of up to 10 wt-%, up to 5 wt-%, or up to 1 wt-%, based on the total weight of the glass-containing filter layer. Preferably, no binder resin is used in the glass-containing filter layer (or in any of the layers of the filter media).

Examples of suitable glass-containing filter layers include those described in U.S. Pat. Nos. 7,309,372, 7,314,497, 7,985,344, 8,057,567, and 8,268,033, and U.S. Publication Nos. 2006/0242933 and 2008/0245037.

In certain embodiments, a depth loading layer includes a melt-blown filter layer. Typically, melt-blowing is a nonwoven web forming process that extrudes and draws molten polymer resins with heated, high velocity gas (e.g., air) to form fine filaments. The filaments are cooled and collected as a web onto a moving screen. The process is similar to the spunbond process, but melt-blown fibers are typically much finer.

Typically, the melt-blown fibers have an average diameter of no greater than 20 microns. In certain embodiments, the melt-blown filter layer includes melt-blown fibers having an average diameter of up to 10 microns, up to 5 microns, up to 4 microns, or up to 3 microns. In certain embodiments, the melt-blown filter layer includes melt-blown fibers having an average diameter of at least 0.5 micron, at least 1 micron, at least 1.5 microns, or at least 2 microns. In certain embodiments, the melt-blown fibers have an average diameter of 2-3 microns.

In certain embodiments, scaffold fibers as described in International Publication No. WO 2013/025445 can be included in the melt-blown filter layer if desired for enhancing performance. However, media with high levels of compressibility have little or no scaffold fibers used as described in International Publication No. WO 2013/025445 in the melt-blown filter layer. The scaffold fibers provide support for the media fiber, and add improved handling, greater tensile strength, and results in lower compressibility to the media.

In certain embodiments, the melt-blown filter layer includes a continuously gradient structure of larger fibers and more open structure at a first major surface and smaller fibers and less open structure at a second major surface. In certain embodiments of this construction, the second major surface of the melt-blown filter layer is adjacent the support layer and the first major surface is positioned as the most upstream surface (i.e., the first layer encountered by the gas (e.g., air) stream during use).

In certain embodiments, a melt-blown filter layer includes a composite of multiple layers of melt-blown fibers with larger fibers and more open structure at a first major surface of the melt-blown composite and smaller fibers and less open structure at a second major surface of the melt-blown composite. In certain embodiments of this construction, the second major surface of the melt-blown filter layer is adjacent the support layer and the first major surface is positioned adjacent the surface loading filter layer.

In certain embodiments, melt-blown fibers can be prepared from a variety of polymers that are suitable for being melt blown. Examples include polyolefins (particularly polypropylene), ethylene-chloro-trifluoro-ethylene, other hydrophobic polymers, or non-hydrophobic polymers (e.g., polybutylene terephthalate, polystyrene, polylactic acid, polycarbonate, nylon, polyphenylene sulfide) with a hydrophobic coating or additive, or combinations thereof (e.g., blends or copolymers). Preferred polymers are polyolefins such as polypropylene, polyethylene, and polybutylene.

In certain embodiments, a melt-blown filter layer includes fibers made from polypropylene, polybutylene terephthalate, or combinations thereof. Particularly preferred melt-blown fibers are made from polypropylene to enhance the watertight characteristics of a preferred filter medium of the present disclosure.

In certain embodiments, the melt-blown filter layer is hydrophobic. By this it is meant that the layer demonstrates a contact angle greater than 90 degrees with water. The fibrous material of which it is made can be hydrophobic (e.g., a polyolefin) or include a hydrophobic additive, or be coated with a hydrophobic material. Similarly, in certain embodiments, to enhance watertight characteristics, the glass-containing filter layer is coated with a hydrophobic coating. Alternatively, a depth loading filter layer can be treated with a plasma treatment technique.

Suitable hydrophobic materials have little or no affinity for water, or completely repel water, and thereby prevent or restrict water from passing through the filter media. Typically, the hydrophobic material demonstrates a contact angle greater than 90 degrees when tested with water. Examples of hydrophobic materials include fluorochemicals, particularly fluoropolymers as described in U.S. Pat. No. 6,196,708.

Examples of useful fluoropolymers include those having a fluoroalkyl portion or, preferably, a perfluoroalkyl portion. These fluoropolymers include, for example, fluoroalkyl esters, fluoroalkyl ethers, fluoroalkyl amides, and fluoroalkyl urethanes. Often, the fluoroalkyl and/or perfluoroalkyl portion extends from a backbone of the polymer.

The fluoropolymers may include a variety of monomer units. Exemplary monomer units include, for example, fluoroalkyl acrylates, fluoroalkyl methacrylates, fluoroalkyl aryl urethanes, fluoroalkyl allyl urethanes, fluoroalkyl maleic acid esters, fluoroalkyl urethane acrylates, fluoroalkyl amides, fluoroalkyl sulfonamide acrylates and the like. The fluoropolymers may optionally have additional non-fluoro monomer units including, for example, unsaturated hydrocarbons (e.g., olefins), acrylates, and methacrylates. Additional examples of suitable fluoropolymers are provided in U.S. Pat. No. 3,341,497.

Commercially available fluoropolymers include those available under the trade designation OLEOPHOBOL CPX from Huntsman (Charlotte, NC), as well as 3M Protective Material PM-490 (a nonionic fluorochemical resin), 3M Protective Material PM-3633 (a fluoropolymer emulsion), 3M L-21484 (a fluorinated amino salt derivative that can be diluted in water or polar organic solvents), all of which are available from 3M Co. (St. Paul, MN).

Other exemplary, commercially available fluoropolymers are provided in aqueous emulsions. The fluoropolymers can be extracted from the aqueous emulsion by removal of the water carrier. The fluoropolymers can then be solvated in an organic solvent. To facilitate the solvation of the fluoropolymer, a compound, such as acetone, can be optionally added to the aqueous emulsion to break the emulsion. In addition, the particles of fluoropolymer can be optionally ground, subsequent to removal of water to make solvation easier and quicker.

Methods of coating such material are conventional and well known to those skilled in the art. A typical coating weight is at least 0.5 wt-% and often no more than 3 wt-%.

Support Layer

Filter media of the present disclosure includes a support layer. The support layer can be of any of a variety of porous materials, including fibrous materials, metal mesh, etc. Typically, fibrous materials used for the support layer are made of natural fiber and/or synthetic fibers. It could be woven or nonwoven. It could be spunbond, wet-laid, etc.

In certain embodiments, the support layer includes fibers having an average diameter of at least 5 microns, or at least 10 microns. In certain embodiments, the support layer can include fibers having an average diameter of up to 250 microns.

In certain embodiments, the support layer has a basis weight of at least 50 grams/meter$^2$ (g/m$^2$ or gsm), or at least 100 gsm. In certain embodiments, the support layer has a basis weight of up to 260 grams/meter$^2$ (g/m$^2$ or gsm), up to 200 g/m$^2$, or up to 150 g/m$^2$.

In certain embodiments, the support layer is at least 0.005 inch (125 microns) thick, and often at least 0.01 inch (250 microns) thick. In certain embodiments, the support layer is up to 0.03 inch (750 microns) thick.

In certain embodiments, the support layer has an air permeability of at least 10 cubic feet per minute (ft$^3$/min) 0 at 125 Pa (80.2 l/m$^2$/sec at 200 Pa), when evaluated separately from the remainder of the construction. In certain embodiments, an air permeability of up to 1000 cubic feet per minute (ft$^3$/min) at 125 Pa (8020 l/m$^2$/s at 200 Pa), when evaluated separately from the remainder of the construction.

In certain embodiments, the support layer has a Gurley stiffness of at least 1000 milligrams, and often at least 5000 milligrams. In certain embodiments, the support layer can have a Gurley stiffness of up to 10,000 milligrams. A method for measuring Gurley stiffness is described in TAPPI No. T543.

Examples of suitable material for the support layer (i.e., substrate) include spunbond, wet-laid, carded, or melt-blown nonwoven. Suitable fibers can be cellulosic fiber, glass fibers, metal fibers, or synthetic polymeric fibers or the combination. Fibers can be in the form of wovens or nonwovens. Plastic or metal screen-like materials both extruded and hole punched, are other examples of filter substrates. Examples of synthetic nonwovens include polyester nonwovens, nylon nonwovens, polyolefin (e.g., polypropylene) nonwovens, polycarbonate nonwovens, or blended or multicomponent nonwovens thereof. Sheet-like substrates (e.g., cellulosic, synthetic, and/or glass or combination webs) are typical examples of filter substrates. Other preferred examples of suitable substrates include polyester or bicomponent polyester fibers (as described herein for the glass-containing filter layer) or polypropylene/ polyethylene terephthalate, or polyethylene/polyethylene terephthalate bicomponent fibers in a spunbond.

In certain embodiments, the support layer includes wet-laid fibers. In certain embodiments, the support layer includes wet-laid cellulose fibers, polyester fibers, or a combination thereof.

In certain embodiments, the support layer is hydrophobic. The fibrous material of which it is made can be hydrophobic (e.g., a polyolefin) or include a hydrophobic additive, or it can be coated with a hydrophobic material, such as the ones described herein for the hydrophobic coating on the glass-containing filter layer, or it can be treated with a plasma treatment technique. Alternatively, if wet-laid, a hydrophobic resin can be applied during the wet-laid process.

Optional Scrim Layer

In certain embodiments, a scrim layer can be used to enhance the stiffness of filter media of the present disclosure. Typically, a scrim layer is disposed between the surface loading filter layer and the depth loading filter layer. Useful materials for the scrim layer typically have a high permeability (i.e., "perm") (e.g., greater than 1600 $l/m^2/s$) and are thin (e.g., less than 0.005 inch) so there is a minimal effect on the flat sheet or filter element performance. Examples of such scrim materials include those available under the tradenames FINON C303NW and FINON C3019 NW from Midwest Filtration in Cincinnati, OH. Others are described, for example, in U.S. Pat. Pub. 2009/0120868.

Filter Elements and Uses

The filter media of the present disclosure can then be manufactured into filter elements (i.e., filtration elements), including, e.g., flat-panel filters, cartridge filters, or other filtration components (e.g., cylindrical or conical). Examples of such filter elements are described in U.S. Pat. Nos. 6,746,517; 6,673,136; 6,800,117; 6,875,256; 6,716,274; and 7,316,723, as well as U.S. Patent Application No. 2014/0260142.

The filter media can be corrugated. Exemplary corrugations are at a depth of 0.020 to 0.035 inch (0.5 mm to 0.9 mm). Corrugated filter media can then typically be pleated to form a pleat pack, then placed and sealed into a housing, as is known in the art.

Filter elements of the present disclosure can be used in industrial filtration such as in dust collectors, and in commercial and residential HVAC systems.

FIGS. 4-14 depict various embodiments of filter elements of the present disclosure that are usable in gas turbine air intake systems or industrial air cleaners.

Figure 4:
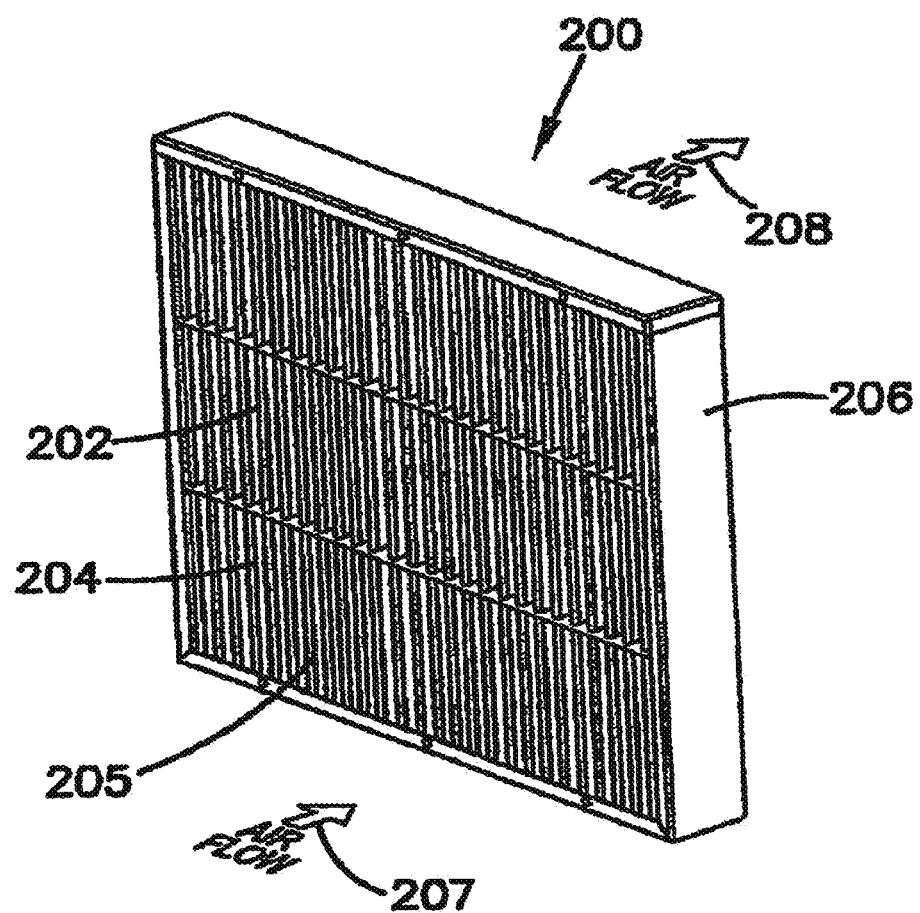
FIG. 4 is a perspective view of one embodiment of a filter element usable in an air intake system.

In FIG. 4, a pleated panel element 200 is shown in perspective view. The panel element 200 includes a media pack 202 of pleated media 204. The pleated media 204 can include a filter medium described herein. In the embodiment shown, the media pack 202 is held within a frame 206, with the examples shown being a rectangular frame 206. The frame 206 typically will include a gasket (not shown) for permitting the element 200 to be sealed against a tube sheet in the intake system. In FIG. 4, the upstream side of the pleated media 204 with the surface loading filter layer is shown at 205 on the same side as the incoming gas (e.g., air) shown at arrow 207. The cleaned gas (e.g., air) is shown at arrow 208, and emerges from the media 204 from a downstream side of the media.

Figure 5:
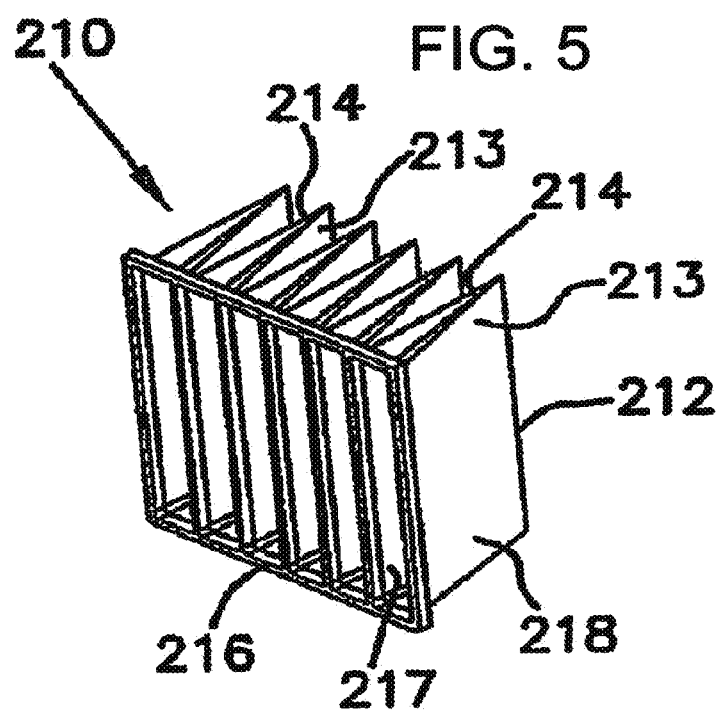
FIG. 5 is a perspective view of another embodiment of another element with a filter medium of the disclosure.

FIG. 5 depicts a perspective view of pocket filter element 210. The pocket element 210 includes a layer of filter media 212 that can comprise a filter medium of the present disclosure. In the embodiment shown, the pocket element 210 includes a plurality of panel pairs 213, 214, with each panel pair 213, 214 forming a V-like shape. The filter media 212 is secured to a frame 216. The frame 216 typically will carry a gasket for allowing the pocket element 210 to be sealed against a tube sheet. In such an arrangement, the media 212 has an upstream melt-blown side 217, which is inside of the V's, and a downstream side 218, which is on the outside of the V's.

Figure 6:
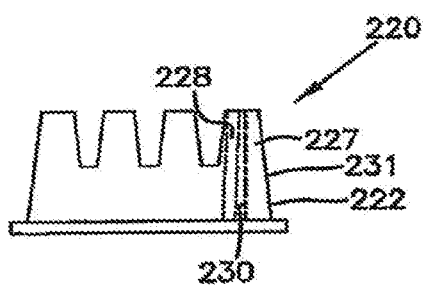
FIG. 6 is a top plan view of another filter element of the disclosure usable in an air intake.
Figure 7:
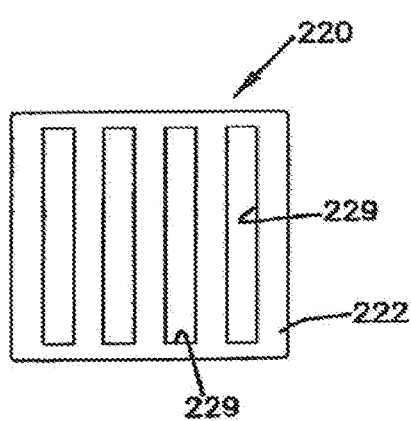
FIG. 7 is a front elevational view of the element of FIG. 6.
Figure 8:
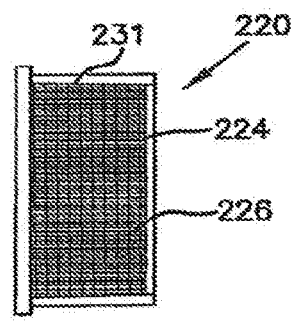
FIG. 8 is a right side elevational view of the filter element of FIG. 7.

FIGS. 6-8 depict views of a mini-pleat or multi-V style element 220. The element 220 includes a frame 222 holding a filter media pack 224 (FIG. 8). The media pack 224 comprises a plurality of mini-pleats. The mini-pleats are arranged in a panel 226, and the element 220 includes a plurality of mini-pleated panel pairs 227, 228 (FIG. 6) of the media of the invention, each forming a V-like shape. In FIG. 6, the panel pairs 227, 228 are shown in hidden lines, since the top portion of the frame 222 obstructs the view of the panel pairs 227, 228. The frame 222 defines a plurality of dirty gas (e.g., air) inlets 229 (FIG. 7), which leads to the inside part of each V of each pleated panel pair 227, 228. Each pleated panel pair 227, 228 includes an upstream side 230, which is on the inside of the V, and a downstream side 231, which is on the outside of the V.

Figure 9:
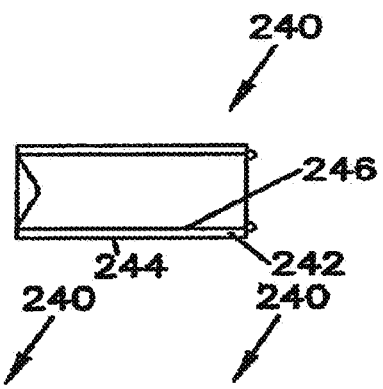
FIGS. 9-13 are schematic, cross-sectional views of further embodiments of filter elements.

FIGS. 9-14 show various embodiments of tubular, pleated filter elements. FIG. 9 shows a cylindrical pleated element 240 having a media pack 242 that can include a filter medium of the present disclosure with an upstream side 244 and a downstream side 246. The downstream side 246 is inside of the interior volume of the element 240.

Figure 10:
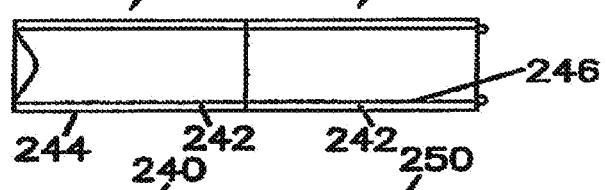

FIG. 10 depicts two of the cylindrical elements 240 axially aligned, such that they are stacked end to end.

Figure 11:
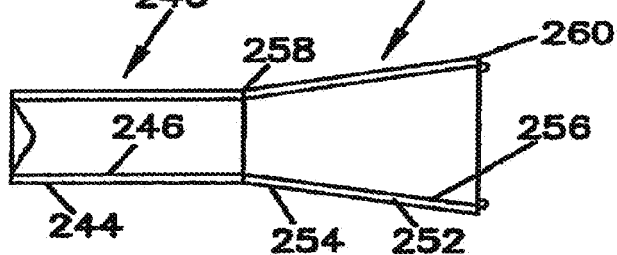

In FIG. 11, cylindrical element 240 is axially aligned with a partially conical element 250. The partially conical element 250 is a tubular element having a media pack 252 that can include a filter medium of the present disclosure. The element has an upstream side 254 and a downstream side 256. The conical element 250 has a first end 258 having a diameter that matches the diameter of the cylindrical element 240. The conical element 250 includes a second end 260 having a diameter that is larger than the diameter of the first end 258, thus forming the partial cone.

Figure 12:
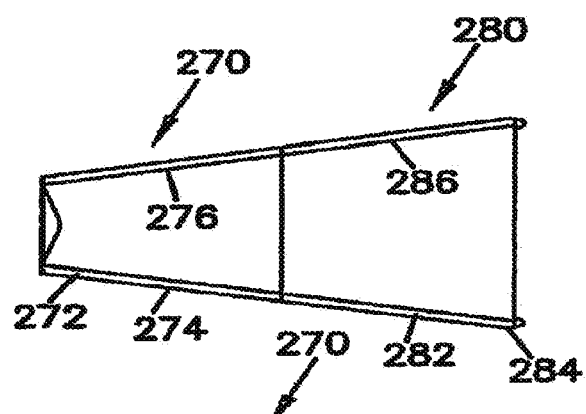

FIG. 12 depicts two partially conical elements 270, 280 arranged axially, and engaged end to end. Each of the elements 270 includes a media pack 272, 282 forming a tube that can include a filter medium of the present disclosure. The media packs 272, 282 each have an upstream side 274, 284 and a downstream side 276, 286.

Figure 13:
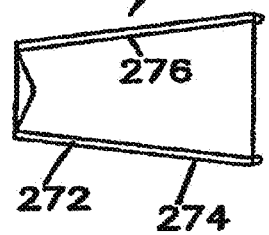

FIG. 13 shows a single conical element 270. The element 270 can be used alone installed in the intake system for a gas turbine without being installed in element pairs, as shown in FIGS. 11 and 12.

Figure 14:
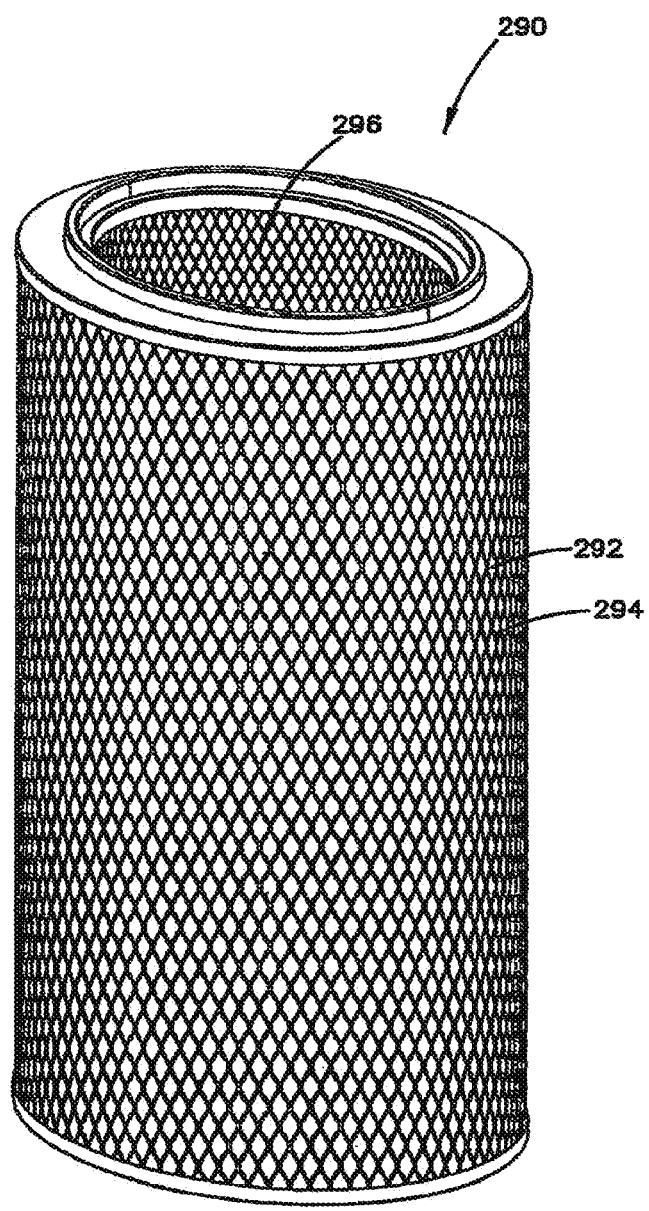
FIG. 14 is a perspective view of another embodiment of a filter element.

FIG. 14 is another embodiment of a filter element 290 having media pack 292 that can include a filter medium of the present disclosure. The media pack 292 is pleated and forms a tubular shape. In this embodiment, the tubular shape is an oval shape, and in one example embodiment, a ratio of the short axis compared to the long axis of the oval is about 0.7-0.9. The media 292 includes an upstream side 294 and a downstream side 296.

Figure 15:
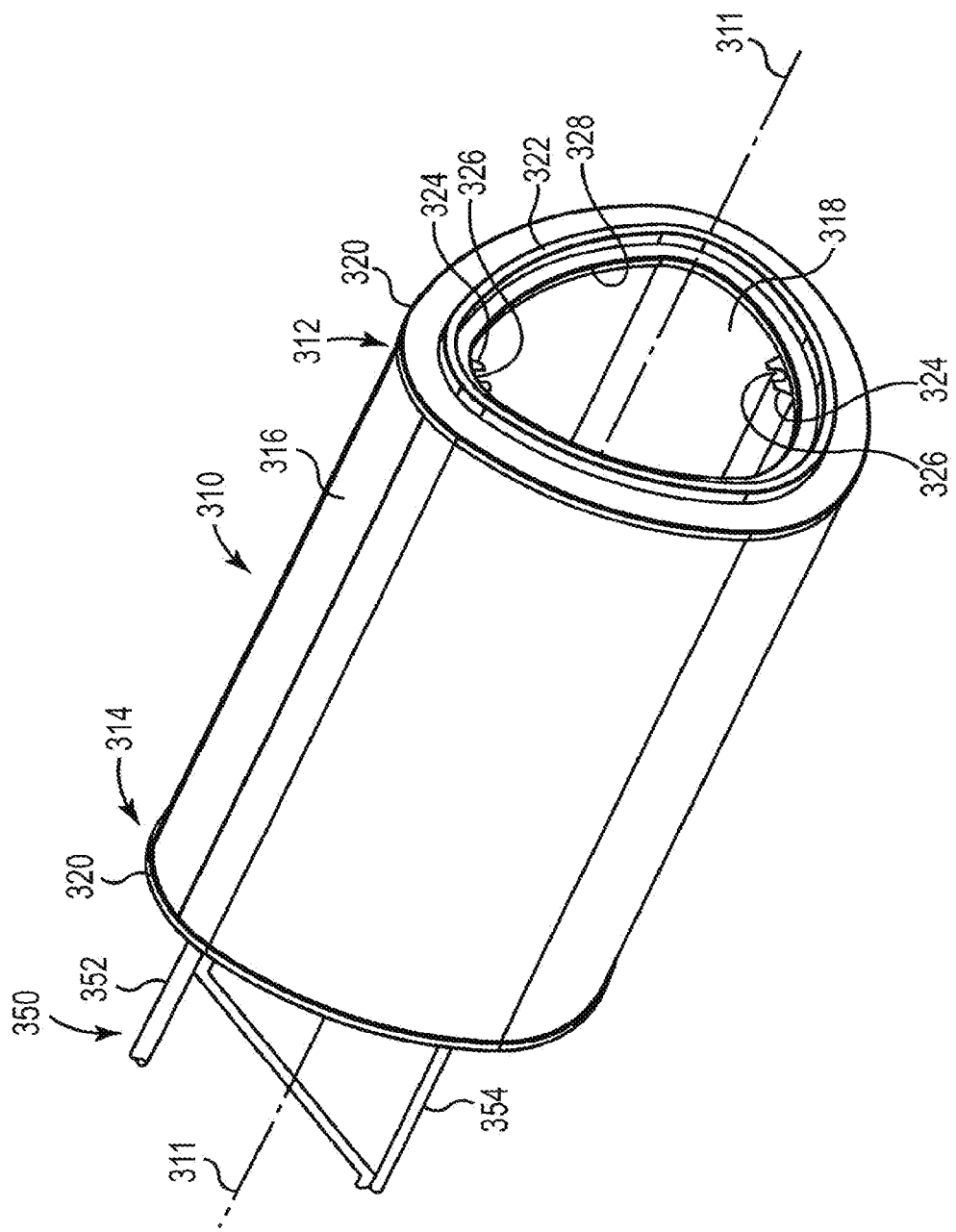
FIG. 15 is a perspective view of another embodiment of a filter element having an ovate structure.

FIG. 15 is another embodiment of a filter element, in the form of an ovate structure, that can include a filter medium of the present disclosure. The filter element includes filter media 310 having end caps 320 located on each of the first end 312 and the second end 314 of the filter media 310. The end cap 320 on first end 312 of the filter media 310 may have an opening that allows access to the interior volume of filter cartridge. The end cap 320 on the opposite end of the filter media 310 may be closed so that it prevents access to the interior volume of the filter cartridge and so that gas (e.g., air) entering the interior volume of the filter cartridge through the end cap 320 on the first end 312 of the filter media 310 must exit through the filter media in the filter element.

Referring to FIG. 15, in one or more alternative embodiments, both end caps 320 may be open to allow access to the interior volume of the filter element. In one or more embodiments, a gasket 322 may be provided on the end cap 320 to seal the filter cartridge over an opening in, e.g., a tubesheet, a venturi, or other structure through which gas is delivered into the interior volume of the filter element. A tube axis 311 extends through the tubular filter cartridge between the first end 312 and the second end 314. The filter media 310 in the filter cartridges described herein defines an exterior surface 316 and interior surface 318 located around the tube axis 311. The interior surface 318 faces an interior volume of the filter cartridge 310 and the exterior surface 316 faces away from that interior volume.

In the filter element of FIG. 15 the end caps 320 may include an alignment mechanism in the form of, e.g., optional tabs 324 in which notches 326 are located. The notches 326 may be sized to receive upper and lower members 352 and 354 of a yoke 350 over which the filter cartridge may be mounted in a filter system. Each of the notches 326 may be described as having, in one or more embodiments, an opening that faces the interior volume of the filter cartridges, with the notch 326 extending towards the inner perimeter 328 of the end cap 320. Although each notch 326 is formed in a single tab 324 in the depicted embodiment, in one or more alternative embodiments, a notch 326 may be formed between two members that protrude from the inner perimeter 328 of the end cap 320 where the two members forming the notch 326 are not the same structural member. The use of two tabs 324 in combination with a yoke 350 having two members 352 and 354 may be beneficial to prevent, or at least limit, rotation of a filter cartridge about its tube axis 311 when installed on the yoke 350 in a filter system. Such filter element is described in further details in U.S. Patent Publication No. 2014/0260142.

It should be understood that each of the filter elements characterized above and depicted in FIGS. 4-15 can be flat media or corrugated media and/or operably installed in an intake system for a gas turbine or other ventilation system.

In operation, gas (e.g., air) to be filtered will be directed through the upstream side, the surface loading fine fiber filter layer and then through the downstream side of filter media in the respective filter element typically installed in a tube sheet. The filter media will remove at least some of the particulate from the gas (e.g., air) stream. After passing through the downstream side of the media, the filtered gas (e.g., air) is then directed to the gas turbine.

EXEMPLARY EMBODIMENTS

Embodiment 1 is a gas filter medium comprising: a surface loading filter layer comprising fine fibers having an average diameter of less than 1 micron; a depth loading filter layer; and a support layer; wherein the layers are configured and arranged for placement in a gas stream with the surface loading filter layer being the most upstream layer.

Embodiment 2 is the filter medium of embodiment 1 which is pulse cleanable.

Embodiment 3 is the filter medium of embodiment 1 or 2 wherein the depth loading filter layer is positioned between the surface loading layer and the support layer.

Embodiment 4 is the filter medium of any one of embodiments 1 through 3 wherein the fine fibers have an average diameter of up to 0.5 micron.

Embodiment 5 is the filter medium of embodiment 4 wherein the fine fibers have an average diameter of up to 0.3 micron.

Embodiment 6 is the filter medium of any one of embodiments 1 through 5 wherein the fine fibers have an average diameter of at least 0.01 micron.

Embodiment 7 is the filter medium of embodiment 6 wherein the fine fibers have an average diameter of at least 0.1 micron.

Embodiment 8 is the filter medium of any one of embodiments 1 through 7 wherein the fine fibers comprise nylon, polyvinylidene fluoride, polyurethane, or combinations thereof.

Embodiment 9 is the filter medium of any one of embodiments 1 through 8 wherein the surface loading filter layer has a LEFS filtration efficiency of at least 30%.

Embodiment 10 is the filter medium of embodiment 9 wherein the surface loading filter layer has a LEFS filtration efficiency of at least 70%.

Embodiment 11 is the filter medium of embodiment 10 wherein the surface loading filter layer has a LEFS filtration efficiency of at least 80%.

Embodiment 12 is the filter medium of any one of embodiments 1 through 11 wherein the surface loading filter layer has a LEFS filtration efficiency of up to 99%.

Embodiment 13 is the filter medium of embodiment 12 wherein the surface loading filter layer has a LEFS filtration efficiency of up to 95%.

Embodiment 14 is the filter medium of embodiment 13 wherein the surface loading filter layer has a LEFS filtration efficiency of up to 90%.

Embodiment 15 is the filter medium of any one of embodiments 1 through 14 wherein the depth loading filter layer comprises a high-efficiency glass-containing filter layer, a high-efficiency melt-blown filter layer, or a combination thereof.

Embodiment 16 is the filter medium of embodiment 15 wherein the depth loading filter layer comprises a high-efficiency glass-containing filter layer comprising glass fibers and multi-component binder fibers.

Embodiment 17 is the filter medium of embodiment 16 wherein the high-efficiency glass-containing layer comprises up to 10 wt-% of a binder resin, based on the total weight of the glass-containing layer.

Embodiment 18 is the filter medium of embodiment 16 or 17 wherein the multi-component binder fibers of the high-efficiency glass-containing filter layer comprise bicomponent fibers having a low melting point polyester sheath and a higher melting point polyester core.

Embodiment 19 is the filter medium of any one of embodiments 16 through 18 wherein the high-efficiency glass-containing filter layer further comprises polyester fibers distinct from the multi-component binder fibers.

Embodiment 20 is the filter medium of embodiment 19 wherein the polyester fibers distinct from the multi-component binder fibers have an average diameter of 10 microns to 14 microns.

Embodiment 21 is the filter medium of any one of embodiments 16 through 20 wherein the high-efficiency glass-containing filter layer comprises glass fibers having an average diameter of 0.4 micron to 0.5 micron.

Embodiment 22 is the filter medium of embodiment 15 wherein the depth loading filter layer comprises a high-efficiency melt-blown filter layer.

Embodiment 23 is the filter medium of embodiment 22 wherein the high-efficiency melt-blown filter layer comprises melt-blown fibers comprising polypropylene, polybutylene terephthalate, or combinations thereof.

Embodiment 24 is the filter medium of embodiment 22 or 23 wherein the high-efficiency melt-blown filter layer comprises melt-blown fibers having an average diameter of 0.5 micron to 10 microns.

Embodiment 25 is the filter medium of embodiment 24 wherein the high-efficiency melt-blown filter layer comprises melt-blown fibers having an average diameter of 0.5 micron to 4 microns.

Embodiment 26 is the filter medium of embodiment 25 wherein the high-efficiency melt-blown filter layer comprises melt-blown fibers having an average diameter of 1 micron to 3 microns.

Embodiment 27 is the filter medium of embodiment 25 wherein the high-efficiency melt-blown filter layer comprises melt-blown fibers having an average diameter of 2 microns to 3 microns.

Embodiment 28 is the filter medium of any one of embodiments 1 through 27 wherein the depth loading filter layer displays a DEHS filtration efficiency of at least 55%.

Embodiment 29 is the filter medium of embodiment 28 wherein the depth loading filter layer displays a DEHS filtration efficiency of at least 70%.

Embodiment 30 is the filter medium of any one of embodiments 1 through 29 wherein the depth loading filter layer displays a DEHS filtration efficiency of up to 99.997%.

Embodiment 31 is the filter medium of embodiment 30 wherein the depth loading filter layer displays a DEHS filtration efficiency of up to 99.97%.

Embodiment 32 is the filter medium of embodiment 31 wherein the depth loading filter layer displays a DEHS filtration efficiency of up to 99.5%.

Embodiment 33 is the filter medium of any one of embodiments 1 through 32 wherein the depth loading filter layer has a basis weight of up to 150 g/m$^2$.

Embodiment 34 is the filter medium any one of embodiments 1 through 33 wherein the depth loading filter layer has a basis weight of at least 10 g/m$^2$.

Embodiment 35 is the filter medium of any one of embodiments 1 through 34 wherein the depth loading filter layer displays a salt loading capacity of at least 1 g/m$^2$ at 500 Pascals pressure rise over initial.

Embodiment 36 is the filter medium of any one of embodiments 1 through 35 wherein the depth loading filter layer displays a salt loading capacity of up to 10 g/m$^2$ at 500 Pascals pressure rise over initial.

Embodiment 37 is the filter medium of any one of embodiments 1 through 36 wherein the support layer has a Gurley stiffness of 1000 milligrams or more.

Embodiment 38 is the filter medium of embodiment 27 wherein the support layer has an air permeability of at least 10 ft$^3$/min at 125 Pa (80.2 l/m$^2$/sec at 200 Pa).

Embodiment 39 is the filter medium of any one of embodiments 1 through 38 wherein the support layer comprises wet-laid fibers.

Embodiment 40 is the filter medium of embodiment 39 wherein the wet-laid fibers comprise cellulose, polyester, or combinations thereof.

Embodiment 41 is the filter medium of any one of embodiments 1 through 40 wherein the support layer has a basis weight of up to 260 g/m$^2$.

Embodiment 42 is the filter medium of any one of embodiments 1 through 41 wherein the support layer has a basis weight of at least 50 g/m$^2$.

Embodiment 43 is the filter medium of any one of embodiments 1 through 42 further comprising a scrim layer disposed between the surface loading filter layer and the depth loading filter layer.

Embodiment 44 is the filter medium of any one of embodiments 1 through 43 having a thickness of at least 10 mils (0.25 mm).

Embodiment 45 is the filter medium of any one of embodiments 1 through 44 having a thickness of up to 60 mils (1.5 mm).

Embodiment 46 is the filter medium of embodiment 45 having a thickness of up to 30 mils (0.76 mm).

Embodiment 47 is the filter medium of any one of embodiments 1 through 46 wherein the layers are adhered together with adhesive, binder fibers, thermal bonding, ultrasonic bonding, self-adhesion, or combinations thereof.

Embodiment 48 is the filter medium of any one of embodiments 1 through 47 which displays an efficiency of at least F9 per EN779:2012.

Embodiment 49 is the filter medium of embodiment 48 which displays an efficiency of at least 80%, or greater than 80%, per the DEHS efficiency test at the most penetrating particle size.

Embodiment 50 is the filter medium of any one of embodiments 1 through 49 which is an air filter medium.

Embodiment 51 is a gas filter element comprising a housing and a gas filter medium of any one of embodiments 1 through 50.

Embodiment 52 is the gas filter element of embodiment 51 which displays an efficiency of at least F9 per EN779:2012.

Embodiment 53 is the gas filter element of embodiment 52 which displays an efficiency of at least E10 per EN1822:2009.

Embodiment 54 is the gas filter element of embodiment 53 which displays an efficiency of at least E11 per EN1822:2009.

Embodiment 55 is the gas filter element of embodiment 54 which displays an efficiency of at least E12 per EN1822:2009.

Embodiment 56 is the gas filter element of any one of embodiments 51 through 55 which is a flat panel, cylindrical, or conical.

Embodiment 57 is the gas filter element of any one of embodiments 51 through 56 which is pleated.

Embodiment 58 is a method of filtering a gas (e.g., air), the method comprising directing the gas through a filter element of any one of embodiments 51 through 57.

Embodiment 59 is a method of filtering a gas, the method comprising directing the gas through a filter medium of any one of embodiments 1 through 55.

Examples

Objects and advantages of this disclosure are further illustrated by the following examples, but the particular materials and amounts thereof recited in these examples, as well as other conditions and details, should not be construed to unduly limit this disclosure.

Test Methods
Salt Loading Test

A TSI 8130 bench is used to load a 100 cm$^2$ sample of filtration media with NaCl salt particles (0.33 μm mass median diameter) at a concentration of 20 mg/m$^3$. The flowrate in the bench was chosen to represent real world conditions. The other settings for the bench are to be run to the manufacturer's standards. The media is loaded anywhere from 4 inches to 10 inches $H_2O$ (1000-2500 Pa) of dP before the end of the test, depending on the requestors needs. Every minute the bench measures the amount of salt loaded, salt passed, and dP across the media. This data is recorded by the bench. Before and after the completion of the test the sample is weighed, the difference in the weight is the salt loaded, and this value is used to calibrate the photometer.

It has been found that media which has greater than 0.5 $g/ft^2$ (5.38 $g/m^2$) capacity when loaded to 2 inches $H_2O$ pressure drop rise at media velocity of 10 feet per minute (fpm) (5.33 cm/sec) is a depth loading media.

Modified ISO11057 Test Method for Filtration Characterization of Cleanable Filter Material To determine the pulse clean-ability of a filter media, a modified version of ISO11057 test method for filtration characterization of cleanable filter media was used. The ISO standard has 5 phases. Phase 2 of the test was used with modification as follows:

Primary leg flow rate: 2.54 $m^3$/hr;
Secondary leg flow rate: 5.07 $m^3$/hr;
Maximum Restriction 1800 Pa;
Dust feed rate: 2.0 $g/m^3$;
Pulse strength: 0.1 MPa; and
200 seconds per cycle, 300 total cycles per test.
All other test conditions remain the same.

The pressure drop (dP) across the media immediately after pulse was recorded for each cycle. The final dP after 300 cycles and dP after extrapolation to 3000 cycles were used to compare the performance of pulse cleanable media. The extrapolation was done by curve fitting a logarithmic or power equation (whichever has the higher $R^2$) to the data (to 300 pulses), then using the equation to determine the dP at 3000 pulses.

DEHS Efficiency Test

A TSI 3160 bench is used to test the efficiency of a 100 $cm^2$ sample media at flows representative of real world conditions, in this case a flow of 4 feet per minute (fpm) was used. An atomizer creates a distribution of DEHS droplets and a Differential Mobility Analyzer (DMA) is used to classify a distribution of DEHS droplets into a cloud of monodisperse particles. The oil droplet sizes for this test are 0.09, 0.1, 0.2, 0.3 and 0.4 μm. A Condensation Particle Counter (CPC) then measures the challenge concentration upstream and downstream of the filter sample in order to determine the media efficiency at that particle size. All other settings are to the manufacturers specifications.

After the efficiency is determined for all particle sizes, the system fits a curve to these points in order to determine what particle size relates to the highest penetration (lowest efficiency), this is called the most penetrating particle size (MPPS) and can be a calculated penetration based on the fitted curve for that particular media sample.

LEFS Test

A 4-inch diameter sample is cut from the media. Particle capture efficiency of the test specimen is calculated using 0.8 μm latex spheres as a test challenge contaminant in the LEFS (for a description of the LEFS test, see ASTM Standard F1215-89) bench operating at 20 fpm.

EXAMPLES

Example 1

Laminated filter media were prepared using the following technique. A 50 gsm wet-laid filter material that includes a mixture of glass and bicomponent PET fibers was prepared similar to that of Example 6 in U.S. Pat. No. 7,314,497 (with the modification that it consists of 40% B08 micro glass fibers from Lauscha Fiber International (Lauscha, Germany) and 60% TJ04BN bicomponent PET fibers from Teijin (Osaka, Japan)). A 116 gsm wet-laid media consisting of 90% cellulose and 10% polyester blend support material was purchased from H&V of East Walpole, MA. The sheet properties are in Table 1.

TABLE 1

Properties of the components of Example 1

| Property | Units | EN937 | EN829 |
|---|---|---|---|
| Basis Weight | lbs./3000 $ft^2$ | 30.5 | 71.3 |
| | grams/$m^2$ | 50 | 116 |
| Fiber Size | μm | 0.8/14 | N/A |
| Thickness (1.5 pounds per square inch (psi)) | inches | 0.0071 | 0.012 |
| | mm | 0.183 | 0.30 |
| Air Permeability | | | |
| @ 0.5 inch (in) $H_2O$ (125 Pascals (Pa)) | fpm | 22.4 | 14.0 |
| @ 200 Pascals (0.8 inch $H_2O$) | l/$m^2$/sec | 179 | 111.9 |
| Hydrostatic Head | mbar | 8.00 | 50.0 |
| Salt loaded at 2 inches $H_2O$ dP rise at 10 fpm | $g/ft^2$ | 0.403 | 0.0374 |
| | $g/m^2$ | 4.33 | 0.403 |
| Pre IPA MPPS DEHS efficiency 4 fpm (2.0 centimeters/seconds (cm/sec)) | % | 95.14 | <10% |
| Post IPA soak MPPS DEHS efficiency 4 fpm (2.0 cm/sec) | % | 93.83 | <10% |

These two rolls were layered so that the glass bicomponent layer was upstream and the cellulose polyester blend was on the bottom. A granular adhesive from EMS-Griltech of Switzerland (Griltex 9E) was applied between the two layers at a rate of 4.07 $g/m^2$, they were then heat laminated at 265° F.

After lamination a fine fiber layer was applied to the 50 gsm glass bicomponent layer. This fine fiber layer was comprised of fibers sized between 0.2 to 0.3 microns, and consisting of Nylon with a LEFS efficiency of 82.4%.

The laminated and nano-fiber coated media was tested for its flat sheet properties and the element was tested for dP and efficiency using the EN1822 procedure. The results are shown in Table 2.

TABLE 2

Properties of the laminated media and element

| Property and Test Results | Units | Example 1 (EX3326, before nano-fiber coating) | Example 1 (EX3326, after nano-fiber coating) |
|---|---|---|---|
| Basis Weight | lbs./3000 $ft^2$ | 101.8 | 101.8 |
| | gram/$m^2$ | 166 | 166 |
| Thickness (wedge foot) | inches | N/A | 0.021 |
| | mm | N/A | 0.533 |
| Air Permeability | | | |
| @ 0.5 inch $H_2O$ (125 Pa) | fpm | 6.1 | 5.9 |
| @ 200 Pascals (0.8 in. $H_2O$) | l/$m^2$/sec | 48.9 | 47.3 |
| Corrugation Depth | inches | N/A | 0.018 |
| | mm | N/A | 0.46 |
| LEFS efficiency of the fine fiber layer at 20 fpm (10.66 cm/s) | % | — | 82.4 |
| Pre IPA soak MPPS DEHS efficiency 4 fpm (2.0 cm/sec) | % | 98.15 | 98.97 |

TABLE 2-continued

Properties of the laminated media and element

| Property and Test Results | Units | Example 1 (EX3326, before nano-fiber coating) | Example 1 (EX3326, after nano-fiber coating) |
|---|---|---|---|
| Post IPA soak MPPS DEHS efficiency 4 fpm (2.0 cm/sec) | % | 97.5 | 98.82 |
| Salt loaded at 2 inches $H_2O$ dP rise at 10 fpm | $g/m^2$ | N/A | N/A |
| ISO11057 (modified) dP after 300 pulses | Pa | N/A | 554 |
| ISO11057 (modified) dP after 3000 pulses (extrapolated) | Pa | N/A | 714 |
| Element dP | inches $H_2O$ Pa | N/A | 1.045 261 |
| Element efficiency at MPPS | % | N/A | 99.541 |

The flat sheet media was pleated at 2 inches (5.1 cm) pleat depth and built into a 26 inch (66 cm) conical and cylindrical filter pair. The conical elements had 280 pleats per element while the cylindrical elements had 230 pleats. The elements were built such that the nano-fiber layer was facing upstream.

Example 2

Laminated filter media were prepared using the following technique. A 50 gsm wet-laid filter material that includes a mixture of glass and bicomponent PET fibers was prepared similar to that of Example 6 in U.S. Pat. No. 7,314,497 (with the modification that it consists of 40% B08 micro glass fibers from Lauscha Fiber International (Lauscha, Germany) and 60% TJ04BN bicomponent PET fibers from Teijin (Osaka, Japan)). A 116 gsm wet-laid media consisting of 90% cellulose and 10% polyester blend support material was purchased from H&V of East Walpole, MA. The sheet properties are in Table 3.

TABLE 3

Properties of the components of Example 2

| Property | Units | EN937 | EN829 |
|---|---|---|---|
| Basis Weight | lbs./3000 $ft^2$ | 30.5 | 71.3 |
| | grams/$m^2$ | 50 | 116 |
| Fiber Size | μm | 0.8/14 | N/A |
| Thickness (1.5 pounds per square inch (psi)) | inches mm | 0.0071 0.183 | 0.012 0.30 |
| Air Permeability | | | |
| @ 0.5 inch (in) $H_2O$ (125 Pascals (Pa)) | fpm | 22.4 | 14.0 |
| @ 200 Pascals (0.8 inch $H_2O$) | $l/m^2/sec$ | 179 | 111.9 |
| Hydrostatic Head | mb ar | 8.00 | 50.0 |
| Salt loaded at 2 inches $H_2O$ dP rise at 10 fpm | $g/ft^2$ $g/m^2$ | 0.40 4.33 | 0.037 0.403 |
| Pre IPA MPPS DEHS efficiency 4 fpm (2.0 cm/sec) | % | 95.14 | N/A |
| Post IPA soak MPPS DEHS efficiency 4 fpm (2.0 cm/sec) | % | 93.83 | N/A |

These two rolls were layered so that the glass bicomponent layer was upstream and the cellulose polyester blend was on the bottom. The two layers were heat laminated at 265° F. using Griltex 9E, a granular adhesive from (EMS-Griltech of Switzerland) at a rate of 4.07 $g/m^2$ between each layer. After lamination, a fine fiber layer was applied to the 116 gsm wet-laid cellulose polyester blend layer. This fine fiber layer was comprised of nylon fibers sized between 0.2 to 0.3 micron, with a LEFS efficiency of 78%. The laminated and nano-fiber coated media was tested for its flat sheet properties. The results are shown in Table 4.

TABLE 4

Properties of the laminated media

| Property | Units | Example 2 (EX3092) |
|---|---|---|
| Basis Weight | lbs./3000 $ft^2$ | 101.8 |
| | grams/$m^2$ | 166.5 |
| Thickness (wedge foot) | inches | 0.025 |
| | mm | 0.635 |
| Air Permeability | | |
| @ 0.5 inch $H_2O$ (125 Pa) | fpm | 5.3 |
| @ 200 Pascals (0.8 inch $H_2O$) | $l/m^2/sec$ | 42.9 |
| Hydrostatic Head | mb | — |
| ISO11057 (modified) dP after 300 pulses | Pa | 382 |
| ISO11057 (modified) dP after 3000 pulses (extrapolated) | Pa | 856 |
| Pre IPA MPPS DEHS efficiency 4 fpm (2.0 cm/sec) | % | 99.46 |
| Post IPA soak MPPS DEHS efficiency 4 fpm (2.0 cm/sec) | % | 99.06 |

The flat sheet media was pleated at 2 inches (5.1 cm) pleat depth and built into a 26 inch (66 cm) conical and cylindrical filter pair. The conical elements had 250 pleats per element while the cylindrical elements had 210 pleats. The elements were built such that the nano-fiber layer was facing upstream.

Example 3

Laminated filter media were prepared using the following technique. A 50 gsm wet-laid filter material that includes a mixture of glass and bicomponent fibers was prepared similar to that of Example 6 in U.S. Pat. No. 7,314,497 (with the modification that it consists of 50% B08 micro glass fibers from Lauscha Fiber International (Lauscha, Germany) and 50% bicomponent PET fibers (TJ04BN) from Teijin (Osaka, Japan)). A 100 gsm spunbond support material of Finon C310NW was purchased from Midwest Filtration of Cincinnati, OH. The sheet properties are in Table 5.

TABLE 5

Properties of the components of Example 3 (EX3167)

| Property | Units | EN0701937 | FINON C310NW |
|---|---|---|---|
| Basis Weight | lbs./3000$ft^2$ | 30.5 | 61.5 |
| | grams/$m^2$ | 50 | 100 |
| Fiber Size | μm | 0.8/14 | 17.4 |
| Thickness (1.5 psi) | Inches | 0.0115 | 0.008 |
| | mm | 0.292 | 0.203 |
| Air Permeability | | | |
| @ 0.5 inch $H_2O$ (125 Pa) | fpm | 10.10 | 108.00 |
| @ 200 Pascals (0.8 inch $H_2O$) | $l/m^2/sec$ | 81 | 864 |
| Hydrostatic Head | mb | 16.00 | 6.00 |
| Salt loaded at 2 inches $H_2O$ dP rise at 10 fpm | $g/ft^2$ $g/m^2$ | 0.40 4.33 | N/A N/A |
| Pre IPA MPPS DEHS efficiency 4 fpm (2.0 cm/sec) | % | 98.81 | <10% |
| Post IPA soak MPPS DEHS efficiency 4 fpm (2.0 cm/sec) | % | 98.03 | <10% |

These two rolls were layered so that the wet-laid layer was in the upstream and the spunbond layer was downstream. The layers were heat laminated at 275° F. using a granular adhesive Griltex 9E (EMS-Griltech of Switzerland) at a rate of 4.07 g/m² between each layer.

The material was then corrugated to an average depth of 0.027 inch (0.69 mm) (measuring the distance in the z direction from the top of the peak to the bottom of the trough on the wire side of the media) with 4.5 corrugations per inch (1.77 corrugations/cm). After corrugation, a fine fiber layer was applied to the 50 gsm wet laid layer. This fine fiber layer was comprised of nylon fibers sized between 0.2 to 0.3 micron, with a LEFS efficiency of 66%.

The laminated, corrugated, and coated media was tested for its flat sheet properties. The results are shown in Table 6.

TABLE 6

Properties of the laminated media

| Property | Units | Example 3 before nano-fiber coating | Example 3 after nano-fiber coating |
|---|---|---|---|
| Basis Weight | lbs./3000 ft² | 92 | 92 |
|  | grams/m² | 150 | 150 |
| Thickness (wedge foot) | inches | N/A | 0.0189 |
|  | mm | N/A | 0.48 |
| Air Permeability |  |  |  |
| @ 0.5 inch H₂O (125 Pa) | fpm | 10.28 | 10.20 |
| @ 200 Pascals (0.8 inch H₂O) | l/m²/sec | 83.24 | 82.62 |
| ISO11057 (modified) dP after 300 pulses | Pa | N/A | N/A |
| ISO11057 (modified) dP after 3000 pulses (extrapolated) | Pa | N/A | N/A |
| Pre IPA MPPS DEHS efficiency 4 fpm (2 cm/sec) | % | 98.38 | 99.55 |
| Post IPA soak MPPS DEHS efficiency 4 fpm (2 cm/sec) | % | 94.73 | 96.29 |
| Corrugation Depth | inches | 0.027 | 0.0106 |
|  | mm | 0.69 | 0.27 |

The flat sheet media was pleated at 2 inches (5.1 cm) pleat depth and built into 26-inch (66 cm) conical and cylindrical filter pairs. The conical elements had 210 pleats per element while the cylindrical elements had 176. The elements were built such that the nanofiber layer was facing upstream.

Example 4

Laminated filter media were prepared using the following technique. A 18.6 gsm spunbond scrim layer of FINON C3019 was purchased from Midwest Filtration of Cincinnati, OH. A 50 gsm wet-laid filter material that includes a mixture of glass and bicomponent fibers was prepared similar to that of Example 6 in U.S. Pat. No. 7,314,497 (with the modification that it consists of 50% B08 micro glass fibers from Lauscha Fiber International (Lauscha, Germany) and 50% bicomponent PET fibers (TJ04BN) from Teijin (Osaka, Japan)). A 100 gsm spunbond support material of Finon C310NW was purchased from Midwest Filtration of Cincinnati, OH. The sheet properties are in Table 7.

TABLE 7

Properties of the components of Example 4 (EX3379)

| Property | Units | FINON C3019 | EN937 | FINON C310NW |
|---|---|---|---|---|
| Basis Weight | lbs./3000 ft² | 11.4 | 30.5 | 61.5 |
|  | grams/m² | 18.6 | 50 | 100 |
| Fiber Size | μm | N/A | 0.8/14 | 17.4 |
| Thickness (1.5 psi) | inches | 0.002 | 0.0115 | 0.008 |
|  | mm | 0.05 | 0.292 | 0.203 |
| Air Permeability |  |  |  |  |
| @ 0.5 inch H₂O (125 Pa) | fpm | 627 | 10.10 | 108 |
| @ 200 Pascals (0.8 inch H₂O) | l/m²/sec | 5079 | 81.81 | 875 |
| Hydrostatic Head | mb | <6.00 | 16.00 | 6.00 |
| Salt loaded at 2 inches H₂O | g/ft² | N/A | 0.40 | N/A |
| dP rise at 10 fpm | g/m² | N/A | 4.33 | N/A |
| Pre IPA MPPS DEHS efficiency 4 fpm (2 cm/sec) | % | <10% | 98.81 | <10% |
| Post IPA soak MPPS DEHS efficiency 4 fpm (2 cm/sec) | % | <10% | 98.03 | <10% |

These three rolls were layered so that the scrim layer was upstream, the wet-laid layer was in the middle, and the spunbond layer was downstream. The layers were heat laminated at 275° F. using GRILTEX 9E granular adhesive (EMS-Griltech of Switzerland) at a rate of 4.07 g/m² between each layer.

The material was then corrugated to an average depth of 0.0248 inch (0.63 mm) (measuring the distance in the z direction from the top of the peak to the bottom of the trough on the wire side of the media) with 4.5 corrugations per inch (1.77 corrugations/cm).

After corrugation, a fine fiber layer was applied to the 18.6 gsm spun bond scrim layer. This fine fiber layer was comprised of nylon fibers sized between 0.2 to 0.3 micron, with a LEFS efficiency of 66%. The laminated, corrugated and fine fiber coated media was tested for its flat sheet properties. The results are shown in Table 8.

TABLE 8

Properties of the laminated media

| Property | Units | Example 4 before nano-fiber coating | Example 4 after nano-fiber coating |
|---|---|---|---|
| Basis Weight | lbs./3000 ft² | 103.4 | 103.4 |
|  | grams/m² | 168.6 | 168.6 |
| Thickness (wedge foot) | inches | 0.018 | 0.019 |
|  | mm | 0.46 | 0.485 |
| Air Permeability |  |  |  |
| @ 0.5 inch H₂O (125 Pa) | fpm | 8.91 | 8.18 |
| @ 200 Pascals (0.8 inch H₂O) | l/m²/sec | 72.17 | 66.26 |
| LEFS efficiency of the fine fiber layer at 20 fpm (10.66 cm/s) | % | — | 66 |
| ISO11057 (modified) dP after 300 pulses | Pa | N/A | N/A |
| ISO11057 (modified) dP after 3000 pulses (extrapolated) | Pa | N/A | N/A |
| Pre IPA MPPS DEHS efficiency 4 fpm (2 cm/sec) | % | 99.49 | 99.74 |
| Post IPA soak MPPS DEHS efficiency 4 fpm (2 cm/sec) | % | 97.3 | 97.74 |
| Corrugation Depth | inches | 0.024 | 0.0105 |
|  | mm | 0.69 | 0.27 |

Example 5

Laminated filter media were prepared using the following technique. A 50 gsm wet-laid filter material that includes a mixture of glass and bicomponent fibers was prepared similar to that of Example 6 in U.S. Pat. No. 7,314,497 (with the modification that it consists of 50% B04 micro glass fibers from Lauscha Fiber International (Lauscha, Germany) and 50% bicomponent PET fibers (TJ04BN) from Teijin (Osaka, Japan)). A 116 gsm corrugated cellulose support material was purchased from H&V of East Walpole, MA. The sheet properties are in Table 9.

TABLE 9

Properties of the components of Example 5 (EX3396)

| Property | Units | EN0701997 | EN448 |
|---|---|---|---|
| Basis Weight | lbs./3000 ft² | 30.5 | 71.3 |
|  | grams/m² | 50 | 116 |
| Fiber Size | μm | 0.4/14 | N/A |
| Thickness (1.5 psi) | inches | 0.009 | 0.012 |
|  | mm | 0.225 | 0.3 |
| Air Permeability |  |  |  |
| @ 0.5 inch H₂O (125 Pa) | fpm | 5.25 | 16 |
| @ 200 Pascals (0.8 inch H₂O) | l/m²/sec | 45.53 | 130 |
| Hydrostatic Head | mb | N/A | N/A |
| Salt loaded at 2 inches H₂O | g/ft² | 0.3031 | 0.0777 |
| dP rise at 10 fpm | g/m² | 3.26 | 0.843 |
| Pre IPA MPPS DEHS efficiency 4 fpm (2 cm/sec) | % | 99.97 | <10% |
| Post IPA soak MPPS DEHS efficiency 4 fpm (2 cm/sec) | % | N/A | <10% |

These two rolls were layered so that the wet-laid layer was upstream and the cellulose wet-laid layer was downstream. The layers were heat laminated at 275° F. using Griltex 9E granular adhesive (EMS-Griltech of Switzerland) at a rate of 4.07 g/m² between each layer.

After lamination, a fine fiber layer was applied to the 50 gsm wet-laid layer. This fine fiber layer was comprised of nylon fibers sized between 0.2 to 0.3 micron, with a LEFS efficiency of 74%.

The laminated and fine fiber coated media was tested for its flat sheet properties. The results are shown in Table 10.

TABLE 10

Properties of the laminated media

| Property | Units | Example 5 before nano-fiber coating | Example 5 after nano-fiber coating |
|---|---|---|---|
| Basis Weight | lbs./3000 ft² | 101.8 | 101.8 |
|  | grams/m² | 161.3 | 161.3 |
| Thickness (wedge foot) | inches | 0.021 | 0.020 |
|  | mm | 0.53 | 0.51 |
| Air Permeability |  |  |  |
| @ 0.5 inch H₂O (125 Pa) | fpm | 3.5 | 3.23 |
| @ 200 Pascals (0.8 inch H₂O) | l/m²/sec | 28.4 | 26.16 |
| ISO11057 (modified) dP after 300 pulses | Pa | N/A | N/A |
| ISO11057 (modified) dP after 3000 pulses (extrapolated) | Pa | N/A | N/A |
| Pre IPA MPPS DEHS efficiency 4 fpm (2 cm/sec) | % | 99.98 | 98.75 |
| Post IPA soak MPPS DEHS efficiency 4 fpm (2 cm/sec) | % | 99.85 | 97.48 |
| Corrugation Depth | inches | 0.0207 | 0.0195 |
|  | mm | 0.53 | 0.48 |

The flat sheet media was pleated at 2 inches (5.1 cm) pleat depth and built into a 26 inch (66 cm) cylindrical filter pair. The elements had 250 pleats per element. The elements were built such that the nano-fiber layer was facing upstream.

Example 6

Laminated filter media were prepared using the following technique. A 50 gsm wet-laid filter material that includes a mixture of glass and bicomponent PET fibers was prepared similar to that of Example 6 in U.S. Pat. No. 7,314,497 (with the modification that it consists of 40% B08 micro glass fibers from Lauscha Fiber International (Lauscha, Germany) and 60% TJ04BN bicomponent PET fibers from Teijin (Osaka, Japan)). A 114 gsm wet-laid media consisting of glass, polyester, and resin support material was purchased from H&V of East Walpole, MA. The sheet properties are in Table 11.

TABLE 11

Properties of the components of Example 6 (EX3380)

| Property | Units | EN937 | EN933 |
|---|---|---|---|
| Basis Weight | lbs./3000 ft² | 30 | 70 |
|  | grams/m² | 50 | 114 |
| Fiber Size | μm | 0.8/14 | N/A |
| Thickness (1.5 psi) | inches | 0.0071 | 0.022 |
|  | mm | 0.183 | 0.56 |
| Air Permeability |  |  |  |
| @ 0.5 inch H₂O (125 Pascals) | fpm | 22.4 | 54 |
| @ 200 Pascals (0.8 inch H₂O) | l/m²/sec | 181.4 | 437 |
| Hydrostatic Head | mbar | 8.00 | N/A |
| Salt loaded at 2 inches H₂O | g/ft² | 0.40 | 0.23 |
| dP rise at 10 fpm | g/m² | 4.33 | 2.49 |
| Pre IPA MPPS DEHS efficiency 4 fpm (2.0 cm/sec) | % | 95.14 | <10% |
| Post IPA soak MPPS DEHS efficiency 4 fpm (2.0 cm/sec) | % | 93.83 | <10% |

The EN933 material was corrugated to an average depth of 0.0283 inch (0.72 mm) (measuring the distance in the z direction from the top of the peak to the bottom of the trough on the wire side of the media) with 4.5 corrugations per inch (1.77 corrugations/cm).

These two rolls were then layered so that the glass bicomponent layer was upstream and the glass polyester blend was on the bottom. The two layers were heat laminated at 265° F. using Griltex 9E, a granular adhesive from (EMS-Griltech of Switzerland) at a rate of 4.07 g/m² between each layer.

After lamination a fine fiber layer was applied to the 50 gsm wet laid layer. This fine fiber layer was comprised of nylon fibers sized between 0.2 to 0.3 micron, with a LEFS efficiency of 62.4%. The laminated and nano-fiber coated media was tested for its flat sheet properties, the results are shown in Table 12.

TABLE 12

Properties of the laminated media

| Property and test results | Units | Example 6 before nano-fiber coating | Example 6 after nano-fiber coating |
|---|---|---|---|
| Basis Weight | lbs./3000 ft² | 100 | 100 |
|  | gram/m² | 164 | 164 |
| Thickness (wedge foot) | inches | 0.023 | 0.021 |
|  | mm | 0.584 | 0.533 |
| Air Permeability |  |  |  |
| @ 0.5 inch H₂O (125 Pa) | fpm | 8.6 | 8.6 |
| @ 200 Pascals (0.8 inch H₂O) | l/m²/sec | 69.7 | 69.7 |
| Corrugation Depth | inches | 0.0195 | 0.022 |
|  | mm | 0.496 | 0.56 |
| ISO11057 (modified) dP after 300 pulses | Pa | N/A | 448 |
| ISO11057 (modified) dP after 3000 pulses (extrapolated) | Pa | N/A | 696 |
| Pre IPA MPPS DEHS efficiency 4 fpm (2.0 cm/sec) | % | 99.34 | 99.43 |
| Post IPA soak MPPS DEHS efficiency 4 fpm (2.0 cm/sec) | % | 98.62 | 98.66 |

The flat sheet media was pleated at 2 inches (5.1 cm) pleat depth and built into a 26 inch (66 cm) conical and cylindrical filter pair. The conical elements had 266 pleats per element while the cylindrical elements had 220 pleats. The elements were built such that the nano-fiber layer was facing upstream.

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed:

1. A gas filter medium comprising:
   a surface loading filter layer;
   a depth loading filter layer comprising glass fibers and multi-component binder fibers, the depth loading filter layer displaying a DEHS filtration efficiency of at least 55% at 0.4 micron size particles and 2 cm/s and a salt loading capacity of at least 1 g/m² at 500 Pascals pressure rise over initial; and
   a support layer;
   wherein the layers are configured and arranged for placement in a gas stream with the surface loading filter layer being the most upstream layer,
   wherein the gas filter medium has a filter medium has a thickness of 0.25 mm to 1.5 mm.

2. The filter medium of claim 1 further comprising one or more additional layers comprising a surface loading filter layer, a depth loading filter layer, or a support layer.

3. The filter medium of claim 1 which is pulse cleanable according to Modified ISO 11057 Test Method.

4. The filter medium of claim 1 wherein the depth loading filter layer is positioned between the surface loading layer and the support layer.

5. The filter medium of claim 1 wherein the surface loading filter layer comprises fine fibers comprising nylon, polyvinylidene fluoride, polyurethane, or combinations thereof.

6. The filter medium of claim 1 wherein the surface loading filter layer has a LEFS filtration efficiency of at least 30% at 0.8 micrometer latex spheres and 20 feet per minute.

7. The filter medium of claim 1 wherein the depth loading filter layer comprises a high-efficiency melt-blown filter layer.

8. The filter medium of claim 1 wherein the support layer has an air permeability of at least 10 ft³/min at 125 Pa.

9. The filter medium of claim 1 wherein the depth loading filter layer comprises a hydrophobic coating.

10. The filter medium of claim 1 which displays an efficiency of at least F9 per EN779:2012.

11. The filter medium of claim 1 which is an air filter medium.

12. The filter medium of claim 1 wherein the surface loading filter layer comprises an oleophobic coating.

13. A gas filter element comprising a housing and a gas filter medium of claim 1.

14. A gas filter medium comprising:
   a surface loading filter layer;
   a depth loading filter layer comprising glass fibers and multi-component binder fibers, the depth loading filter layer displaying a DEHS filtration efficiency of at least 55% at 0.4 micron size particles and 2.1 cm/s and a salt loading capacity of at least 1 g/m² at 500 Pascals pressure rise over initial; and
   a support layer having a Gurley stiffness of 1000 milligrams or more;
   wherein the layers are configured and arranged for placement in a gas stream with the surface loading filter layer being the most upstream layer.

15. The filter medium of claim 14 further comprising one or more additional layers comprising a surface loading filter layer, a depth loading filter layer, or a support layer.

16. The filter medium of claim 14 which is pulse cleanable according to Modified ISO 11057 Test Method.

17. The filter medium of claim 14 wherein the surface loading filter layer comprises fine fibers comprising nylon, polyvinylidene fluoride, polyurethane, or combinations thereof.

18. The filter medium of claim 14 which is an air filter medium.

19. The filter medium of claim 14 wherein the surface loading filter layer comprises an oleophobic coating.

20. A gas filter element comprising a housing and a gas filter medium of claim 14.

* * * * *